United States Patent
Sudo

(10) Patent No.: US 10,453,486 B2
(45) Date of Patent: Oct. 22, 2019

(54) MAGNETIC DISK DEVICE AND ACTUATOR CONTROL METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Daisuke Sudo, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/101,662

(22) Filed: Aug. 13, 2018

(65) Prior Publication Data
US 2019/0272850 A1    Sep. 5, 2019

(30) Foreign Application Priority Data

Mar. 1, 2018    (JP) .................................. 2018-036787

(51) Int. Cl.
  *G11B 5/09*     (2006.01)
  *G11B 5/55*     (2006.01)
  *G11B 5/596*    (2006.01)

(52) U.S. Cl.
  CPC .......... *G11B 5/5547* (2013.01); *G11B 5/5556* (2013.01); *G11B 5/59622* (2013.01)

(58) Field of Classification Search
  None
  See application file for complete search history.

(56) References Cited

U.S. PATENT DOCUMENTS

| | | | | |
|---|---|---|---|---|
| 4,613,915 A | * | 9/1986 | Crouse | G11B 5/58 360/135 |
| 4,656,533 A | * | 4/1987 | Sakai | G11B 5/012 360/46 |
| 4,701,815 A | * | 10/1987 | Yada | G11B 5/59655 360/77.06 |
| 5,526,328 A | * | 6/1996 | Oshima | G06F 1/1626 369/13.02 |
| 5,608,586 A | | 3/1997 | Sri-Jayantha et al. | |
| 5,774,290 A | * | 6/1998 | Sasaki | G11B 5/0086 360/51 |
| 6,373,805 B1 | * | 4/2002 | Song | G11B 7/0045 369/100 |

(Continued)

FOREIGN PATENT DOCUMENTS

| | | |
|---|---|---|
| JP | 2004-503893 A | 2/2004 |
| JP | 2005-032337 A | 2/2005 |

(Continued)

*Primary Examiner* — Peter Vincent Agustin
(74) *Attorney, Agent, or Firm* — White & Case LLP

(57) ABSTRACT

According to one embodiment, a magnetic disk device includes a disk, a first head, a second head, an actuator configured to position the first head and the second head over the disk, and a controller configured to control the actuator based on a first value having a first waveform suppressing a disturbance component, wherein the controller is configured to invert, in the first waveform, a polarity of a third waveform succeeding a first timing with respect to a polarity of a second waveform preceding the first timing in a case where the first head is changed to the second head at the first timing.

3 Claims, 16 Drawing Sheets

(56) References Cited

U.S. PATENT DOCUMENTS

| | | | |
|---|---|---|---|
| 7,564,643 B2 | 7/2009 | Takaishi et al. | |
| 2003/0206365 A1 | 11/2003 | Ho et al. | |
| 2006/0012903 A1* | 1/2006 | Asakura | B82Y 10/00 360/48 |
| 2006/0158764 A1* | 7/2006 | Suzuki | G11B 5/1278 360/68 |
| 2007/0253098 A1 | 11/2007 | Takaishi | |
| 2010/0321819 A1 | 12/2010 | Atsumi | |
| 2014/0104996 A1 | 4/2014 | Tsuchiyama et al. | |
| 2016/0125902 A1 | 5/2016 | Iwashiro | |

FOREIGN PATENT DOCUMENTS

| | | |
|---|---|---|
| JP | 4550764 B2 | 9/2010 |
| JP | 4827973 B2 | 11/2011 |
| JP | 5687334 B2 | 3/2015 |

\* cited by examiner

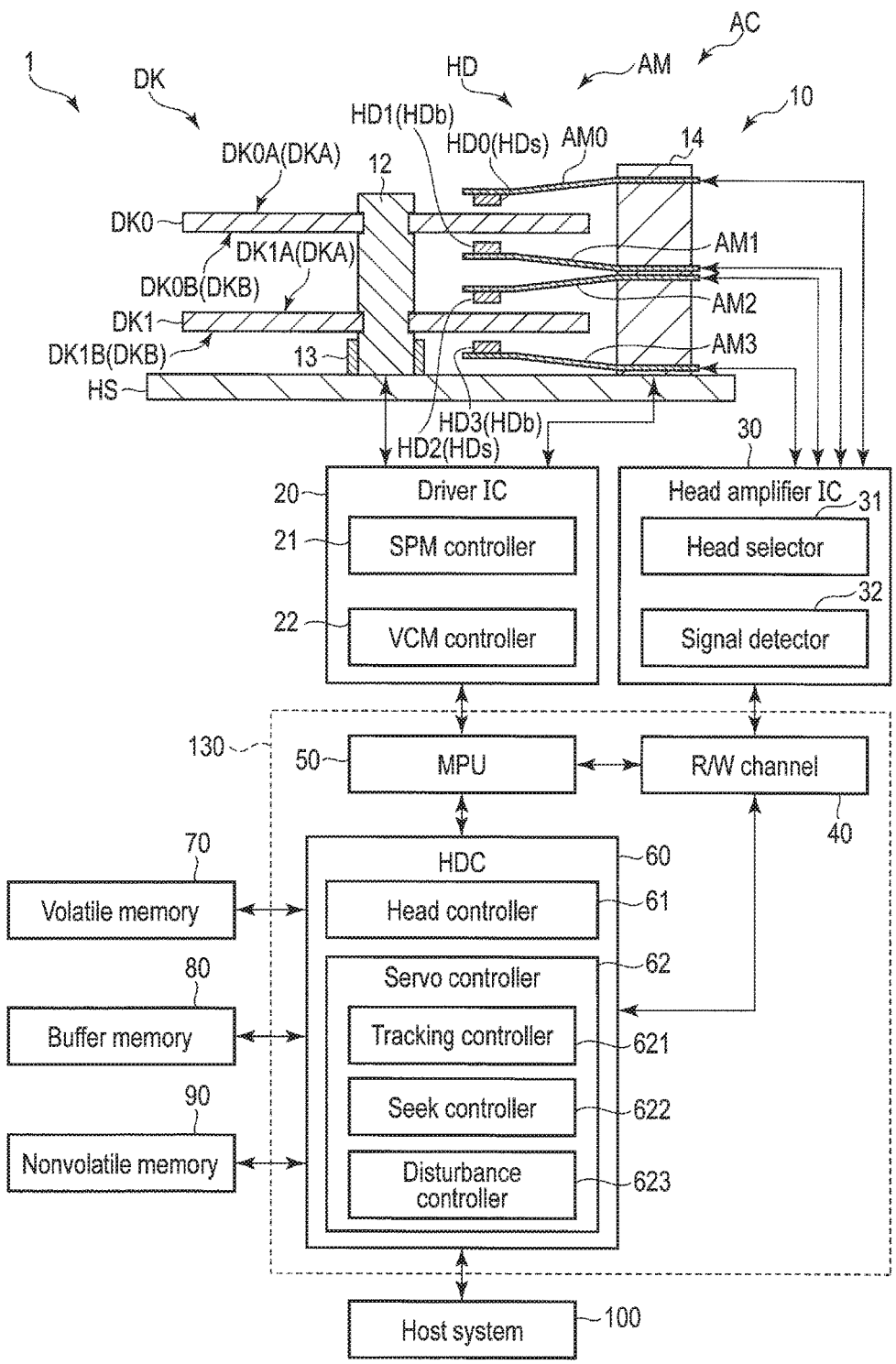
F I G. 1

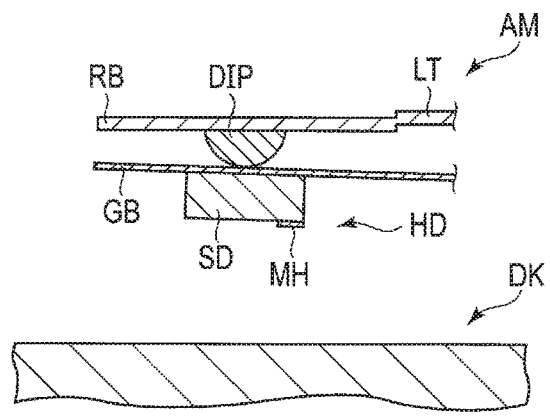
F I G. 3
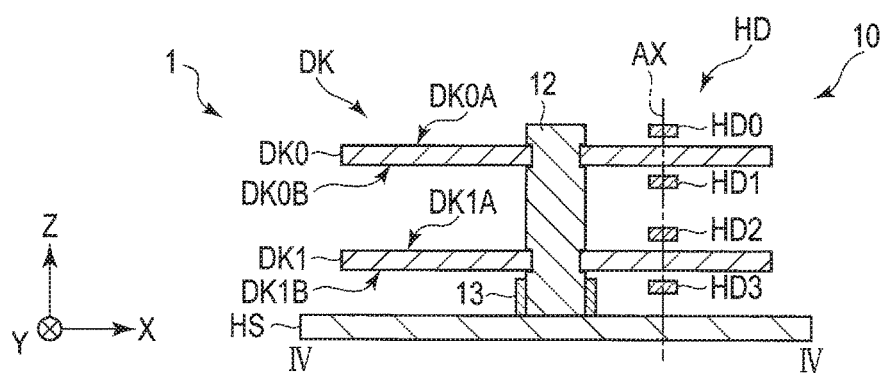
F I G. 4
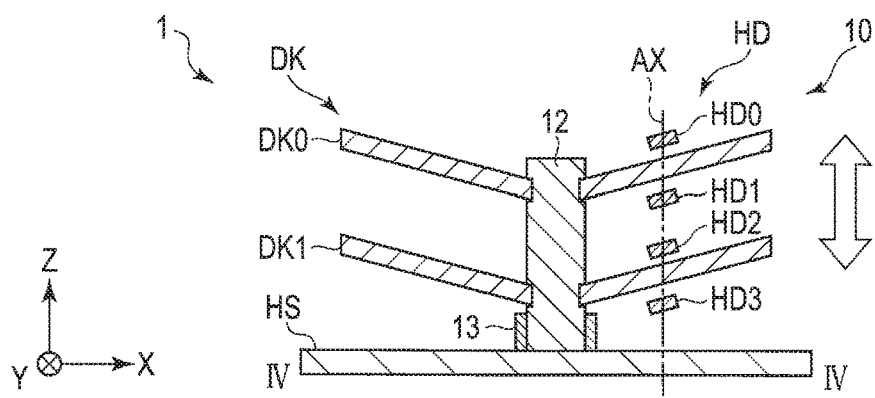
F I G. 5

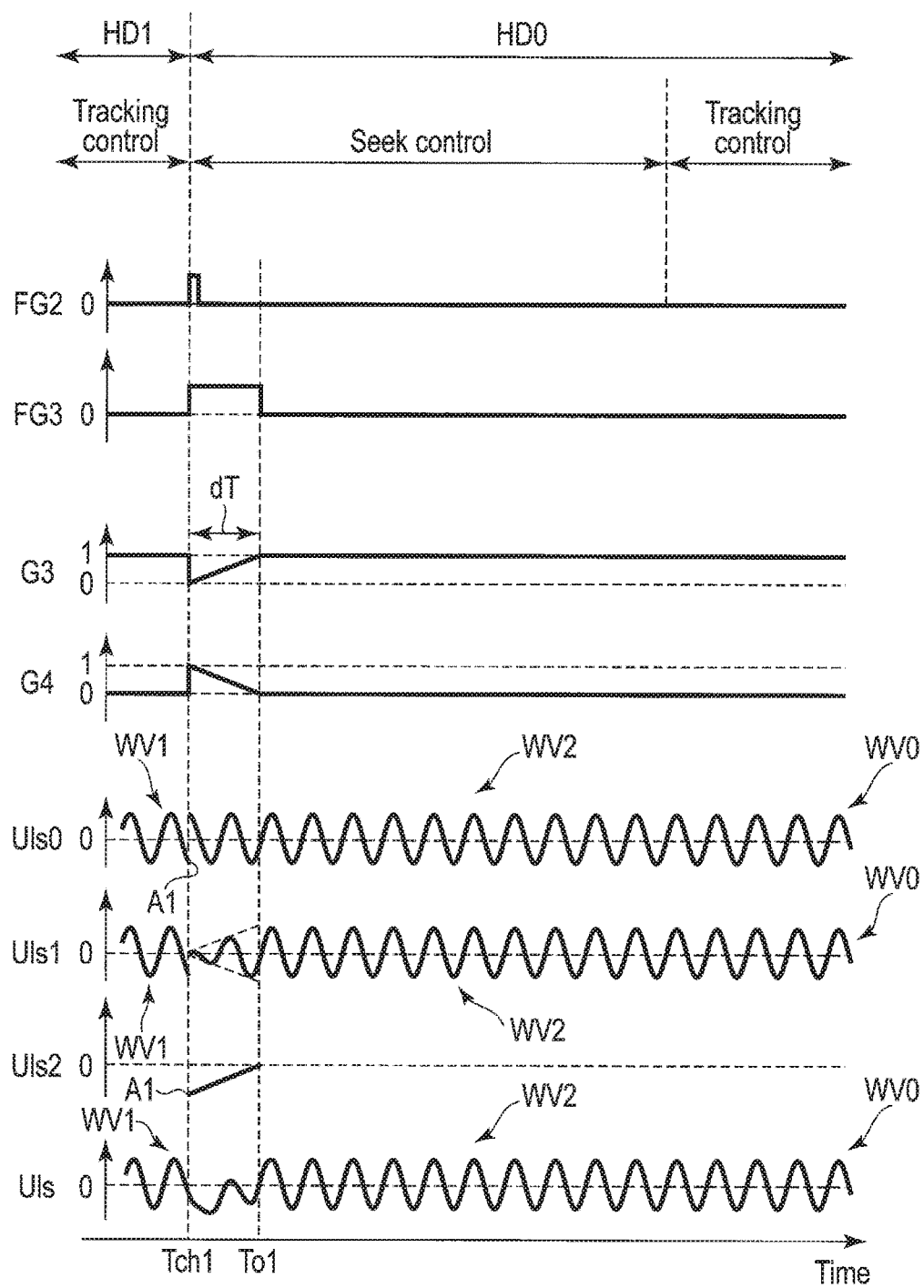
F I G. 13

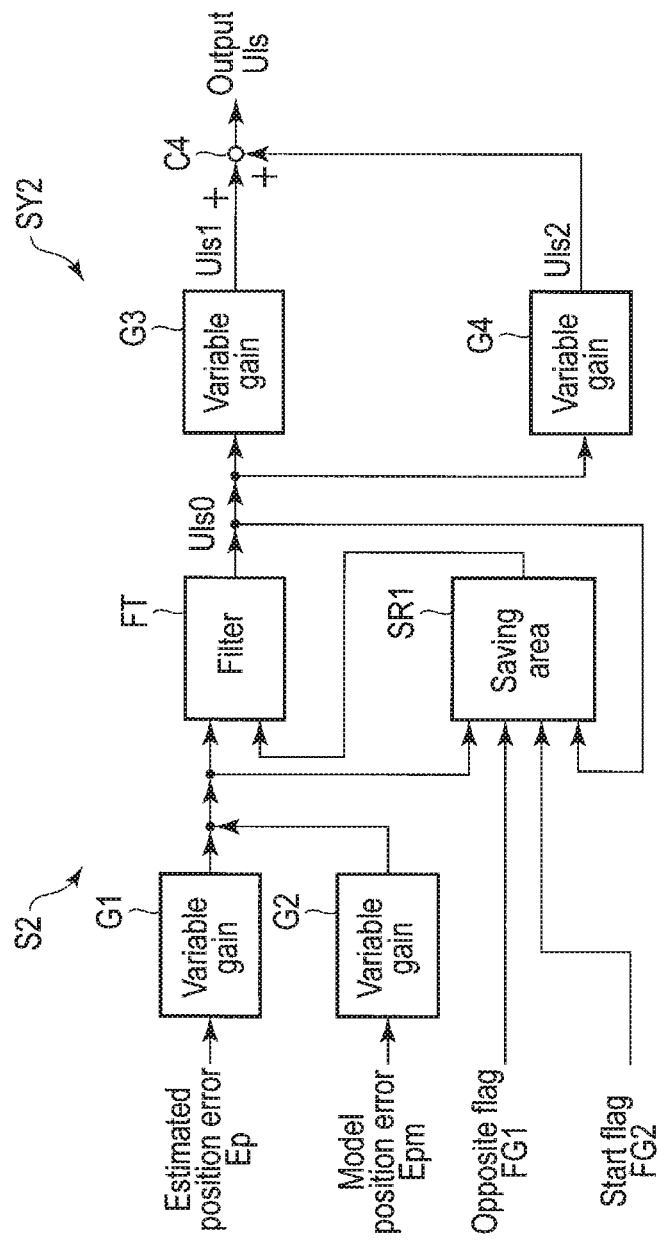
F I G. 15

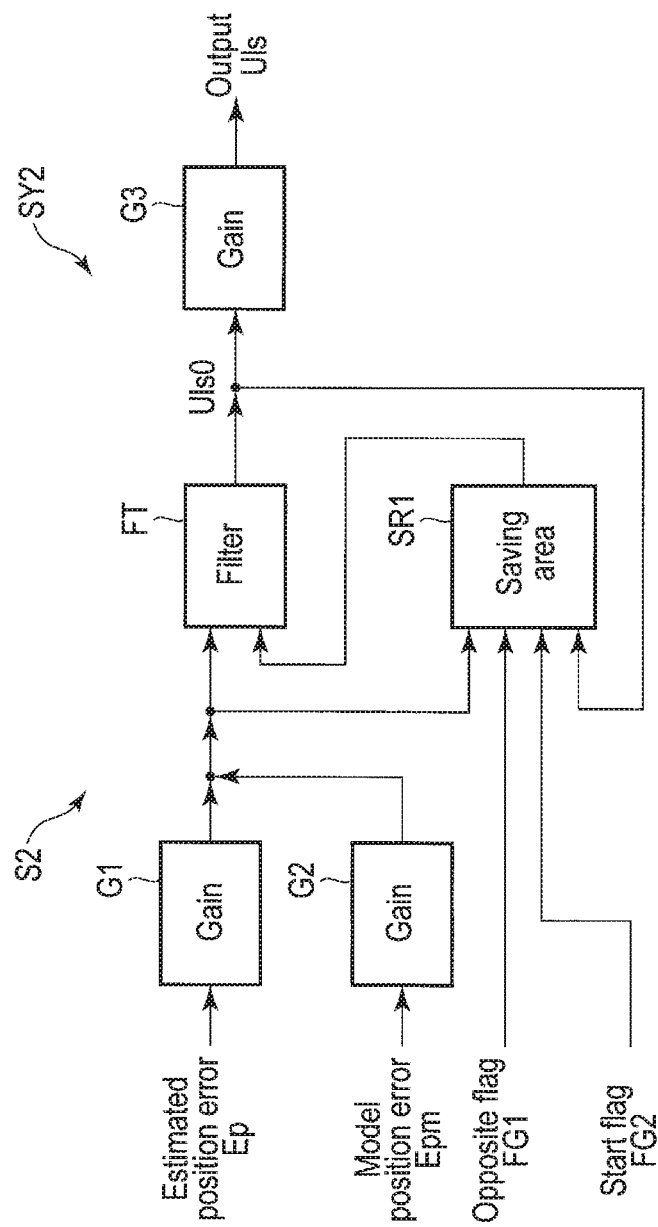
F I G. 17

MAGNETIC DISK DEVICE AND ACTUATOR CONTROL METHOD

CROSS-REFERENCE TO RELATED APPLICATIONS

This application is based upon and claims the benefit of priority from Japanese Patent Application No. 2018-036787, filed Mar. 1, 2018, the entire contents of which are incorporated herein by reference.

FIELD

Embodiments described herein relate generally to a magnetic disk device and an actuator control method.

BACKGROUND

A magnetic disk device comprises at least one disk and at least one head. If the plurality of disks are vibrated by disturbance or the like, the plurality of heads may be displaced to different positions. Thus, if one of the heads is changed to a different head, the magnetic disk device may have difficulty positioning each of the heads at a particular track.

BRIEF DESCRIPTION OF THE DRAWINGS

FIG. 1 is a schematic diagram illustrating an example of a configuration of a magnetic disk device according to a first embodiment.

FIG. 3 is a schematic diagram illustrating an example of a configuration of a tip portion of an arm.

FIG. 4 is a cross-sectional view taken along line IV-IV in FIG. 2 and illustrating an example of a configuration of an HDA.

FIG. 5 is a cross-sectional view illustrating a state of vibration of the HDA illustrated in FIG. 4.

FIG. 13 is a diagram illustrating an example of a disturbance suppression process according to Modification 1.

FIG. 15 is a block diagram illustrating an example of a disturbance suppression processing system according to Modification 2.

FIG. 17 is a block diagram illustrating an example of a disturbance suppression processing system according to Modification 3.

DETAILED DESCRIPTION

Figure 2:
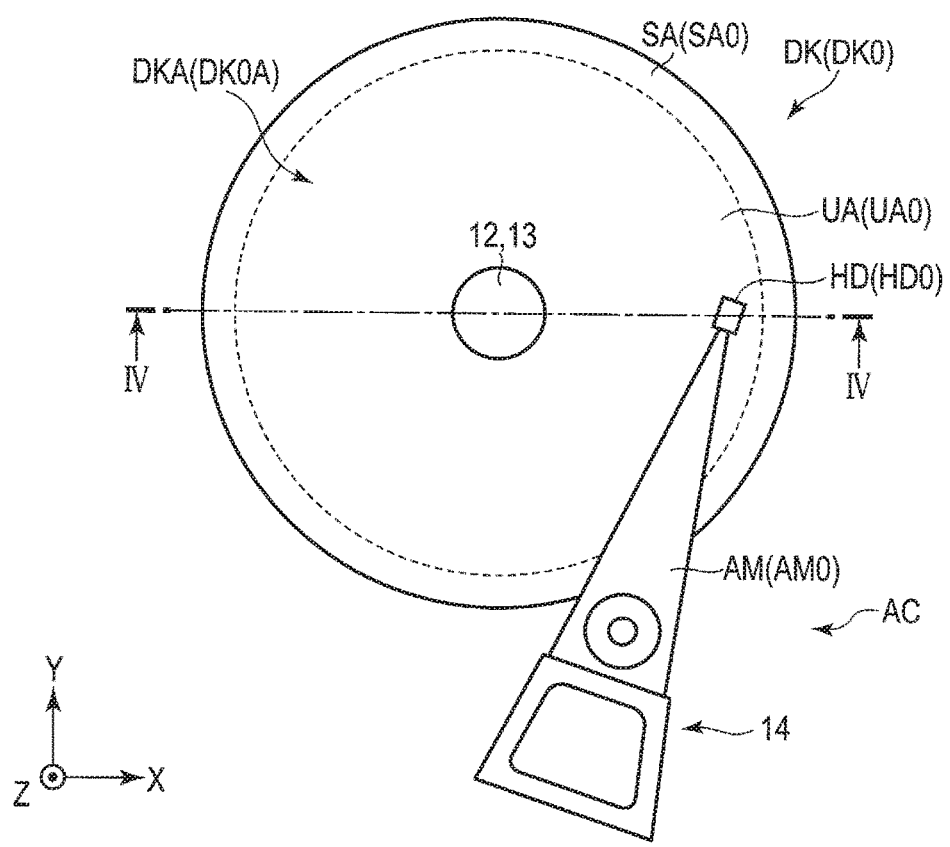
FIG. 2 is a plan view schematically illustrating an example of a disk.

In general, according to one embodiment, a magnetic disk device comprises: a disk comprising a first surface and a second surface opposite to the first surface; a first head configured to execute read/write processing on the first surface; a second head configured to execute read/write processing on the second surface; an actuator configured to position the first head and the second head over the disk; and a controller configured to control the actuator based on a first value having a first waveform suppressing a disturbance component, wherein the controller is configured to invert, in the first waveform, a polarity of a third waveform succeeding a first timing with respect to a polarity of a second waveform preceding the first timing in a case where the first head is changed to the second head at the first timing.

According to another embodiment, a magnetic disk device comprises: a disk comprising a first surface and a second surface opposite to the first surface; a first head configured to execute read/write processing on the first surface; a second head configured to execute read/write processing on the second surface; an actuator configured to position the first head and the second head over the disk; and a controller configured to control the actuator based on a first value suppressing a disturbance component, wherein the controller is configured to adjust the first value based on at least one of a ratio between a first amplitude of the first head and a second amplitude of the second head and correction of phases in a case where the first head is changed to the second head at a first timing.

According to another embodiment, an actuator control method applied to a magnetic disk device comprising a disk comprising a first surface and a second surface opposite to the first surface, a first head configured to execute read/write processing on the first surface, a second head configured to execute read/write processing on the second surface, and an actuator configured to position the first head and the second head over the disk, the actuator control method comprising: controlling the actuator based on a first value having a first waveform suppressing a disturbance component, inverting, in the first waveform, a polarity of a third waveform succeeding a first timing with respect to a polarity of a second waveform preceding the first timing in a case where the first head is changed to the second head at the first timing.

Embodiments will be described below with reference to the drawings. The drawings are illustrative and are not intended to limit the scope of the invention.

First Embodiment

FIG. 1 is a block diagram illustrating a configuration of a magnetic disk device 1 according to a first embodiment.

The magnetic disk device 1 comprises a housing HS, a head disk assembly (HDA) 10, a driver IC 20, a head amplifier integrated circuit (hereinafter referred to as the head amplifier IC or preamplifier) 30, a volatile memory 70, a buffer memory (buffer) 80, a nonvolatile memory 90, and a system controller 130 that is a one-chip integrated circuit. The magnetic disk device 1 is also connected to a host system (hereinafter simply referred to as the host) 100. FIG. 1 illustrates a cross section of the HDA 10.

The HDA 10 comprises a magnetic disk (hereinafter referred to as the disk) DK, a spindle motor (hereinafter referred to as the SPM) 13 which rotates the disk DK around a spindle 12, an arm AM on which a head HD is mounted, and a voice coil motor (hereinafter referred to as the VCM) 14. The SPM 13 and the VCM 14 are fixed to the housing HS. The disk DK is attached to the spindle 12 and driven and rotated by the SPM 13. The arm AM and the VCM 14 constitute an actuator AC. The actuator AC controls the position of the head HD. At least one disk DK and at least one head HD are provided.

The disk DK comprises a front surface DKA on which data is recorded and a back surface DKB opposite to the front surface DKA. The back surface DKB faces in a direction opposite to a direction in which the front surface DKA faces. "The front surface DKA and the back surface DKB of the disk DK" may hereinafter collectively be referred to as a "recording surface". In the example illustrated in FIG. 1, the disk DK includes a disk DK0 and a disk DK1. The disk DK0 comprises a front surface DK0A and a back surface DK0B opposite to the front surface DK0A. The disk DK1 comprises a front surface DK1A and a back surface DK1B opposite to the front surface DK1A. The disk DK may include only one disk or three or more disks.

FIG. 2 is a plan view schematically illustrating an example of the disk DK. A first direction X, a second direction Y, and a third direction Z are orthogonal to one another but may intersect one another in a state other than the orthogonal state. A direction toward a tip of an arrow indicating the third direction Z is referred to as an upper side, and a direction opposite to the tip of the arrow indicating the third direction Z is referred to as a lower side. Furthermore, a length in the first direction may be referred to as a width.

The disk DK includes areas reserved as a user data area UA available to a user and a system area SA to which information needed for system management is written. In the example illustrated in FIG. 2, the user data area UA0 and the system area SA0 are reserved in the front surface DK0A. A direction orthogonal to a radial position of the disk DK is hereinafter referred to as the circumferential direction. In the radial position, a direction toward the spindle 12 is referred to as an inner side, and a direction opposite to the inner side is referred to as an outer side.

The head HD is attached to a tip portion of the arm extending from the VCM 14. The head HD lies opposite to the recording surface of the disk DK. In the example illustrated in FIG. 1, the head HD includes a head HD0, a head HD1, a head HD2, and a head HD3. The arm AM includes an arm AM0, an arm AM1, an arm AM2, and an arm AM3. The head HD0 is attached to a tip portion of the arm AM0 extending from the VCM 14 toward the front surface DK0A of the disk DK0. The head HD1 is attached to a tip portion of the arm AM1 extending from the VCM 14 toward the back surface DK0B of the disk DK0. The head HD2 is attached to a tip portion of the arm AM2 extending from the VCM 14 toward the front surface DK1A of the disk DK1. The head HD3 is attached to a tip portion of the arm AM3 extending from the VCM 14 toward the back surface DK1B of the disk DK1. The head HD0 lies opposite to the front surface DK0A of the disk DK0. The head HD1 lies opposite to the back surface DK0B of the disk DK0. The head HD2 lies opposite to the front surface DK1A of the disk DK1. The head HD3 lies opposite to the back surface DK1B of the disk DK1. The head HD0 lies opposite to the head HD1 via the disk DK0. The head HD2 lies opposite to the head HD3 via the disk DK1. In other words, the direction in which the heads HD0 and HD2 face is opposite to the direction in which the heads HD1 and HD3 face. The head HD0 and the head HD2 face in the same direction. The head HD1 and the head HD3 face in the same direction. The "head HD lying opposite to the front surface DKA of the disk DK" may hereinafter be referred to as the "front surface head HDs", and the "head HD lying opposite to the back surface DKB" may hereinafter be referred to as the "back surface head HDb". In the example illustrated in FIG. 1, the front surface head HDs includes the heads HD0 and HD2, and the back surface head HDb includes the heads HD1 and HD3. The head HD may include only one head or three or more heads. The arm AM may include only one arm or three or more arms.

Furthermore, the head HD is driven by the actuator AC (for example, the VCM 14) and placed at a particular position on the recording surface of the disk DK. In the example illustrated in FIG. 2, the head HD0 is rotationally driven by the VCM 14 and placed at a particular position on the front surface DK0A of the disk DK0.

FIG. 3 is a schematic diagram illustrating an example of a configuration of the tip portion of the arm AM. The head HD comprises a slider SD as a main body and a magnetic head unit MH mounted on the slider SD opposite to the disk DK. The magnetic head unit MH writes data to the disk DK and reads data from the disk DK. The magnetic head unit MH writes data to a particular position on the opposite recording surface and reads data from a particular position on the opposite recording surface. The magnetic head unit MH comprises a write head and a read head. The write head writes data onto the disk DK. The read head reads data recorded in data tracks on the disk DK. The head HD is attached to a gimbal GB provided at the tip of the arm AM. The head HD is movable using, as a support, a dimple DIP formed like a hemisphere. The dimple DIP is attached to a load beam extending from a lift tab LT. The dimple DIP lies opposite to the position of the gimbal GB.

FIG. 4 is a cross-sectional view taken along line IV-IV in FIG. 2 and illustrating an example of a configuration of the HDA 10, and FIG. 5 is a cross-sectional view illustrating an example of a state of vibration of the HDA 10 illustrated in FIG. 4. FIG. 4 and FIG. 5 illustrate only needed components. In FIG. 4 and FIG. 5, the housing HS extends in a first direction X, the spindle 12 and the SPM 13 extend in a third direction Z, and the disk DK extends from the spindle 12 toward the first direction X.

If the HDA 10 is not vibrated, the plurality of heads HD are placed in tandem on an axis AX extending in the third direction Z as illustrated in FIG. 4. In the example illustrated in FIG. 4, the center of width of each of the heads HD0 to HD3 is positioned on the axis AX. In other words, the heads HD0 to HD3 lie in tandem on the axis AX. The head HD0 lies opposite to a position on the front surface DK0A which is located on the axis AX. The head HD1 lies opposite to a position on the back surface DK0B which is located on the axis AX. The head HD2 lies opposite to a position on the front surface DK1A which is located on the axis AX. The head HD3 lies opposite to a position on the back surface DK1B located on the axis AX. If the HDA 10 is vibrated by disturbance or the like, each of the plurality of heads HD may be displaced from a target position on the disk DK (hereinafter referred to as the target position) because the head HD is movable using, as a support, the dimple DIP illustrated in FIG. 3. If the HDA 10 is vibrated at a particular low frequency, for example, 0 to 500 Hz, the plurality of disks DK may be vibrated at the same amplitude and toward the same side in the third direction Z. Here, the term "same" includes not only the perfect sameness of two or more target physical quantities but also such a difference between the two or more physical quantities as allows the physical quantities to be considered to be substantially the same. The "vibration at the same amplitude and toward the same side" as described above is expressed as "synchronous vibration". A "phenomenon in which the plurality of disks DK are synchronously vibrated as a result of vibration of the HDA 10 at a particular low frequency" is hereinafter referred to as the "synchronous resonance mode". The synchronous resonance mode may be referred to as a drum mode.

If the synchronous resonance mode occurs, the plurality of disks DK are synchronously vibrated. In this case, the plurality of heads HD are vibrated in response to vibration of the plurality of disks DK. The front surface heads HDs included in the plurality of heads HD are displaced toward the same side with respect to the front surface DKA. The back surface heads HDb of the plurality of heads HD are displaced toward the same side with respect to the back surface DKB. The front surface heads HDs are displaced toward the side opposite to the side toward which the back surface heads HDb are displaced. In the example illustrated in FIG. 5, the disk DK0 and the disk DK1 are vibrated synchronously in the third direction Z due to the synchronous resonance mode. The disk DK0 and the disk DK1 are inclined obliquely upward from the inner side toward the outer side. The head HD0 is inclined obliquely upward from the inner side toward the outer side along the front surface DK0A. Thus, the head HD0 is displaced to a position on the outer side of the position on the front surface DK0A located on the axis AX. The head HD1 is inclined obliquely downward from the outer side toward the inner side along the back surface DK0B. Thus, the head HD1 is displaced to a position on the inner side of the position on the front surface DK0B located on the axis AX. The head HD2 is inclined obliquely upward from the inner side toward the outer side along the front surface DK1A. Thus, the head HD2 is displaced to a position on the outer side of the position on the front surface DK1A located on the axis AX. The head HD3 is inclined obliquely downward from the outer side toward the inner side along the back surface DK1B. Thus, the head HD3 is displaced to a position on the inner side of the position on the back surface DK1B located on the axis AX. The head HD0 and the head HD2 are displaced toward the same side. The head HD1 and the head HD3 are displaced toward the same side.

Figure 6:
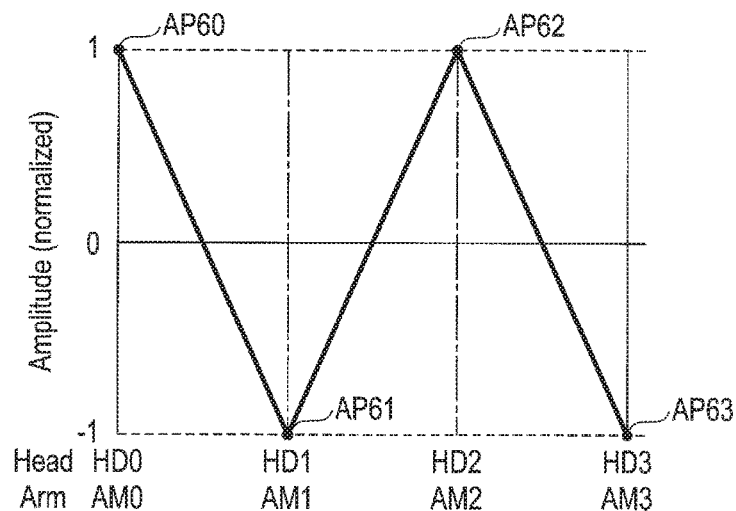
FIG. 6 is a diagram illustrating an example of amplitudes corresponding to heads and arms in a case where the HDA is vibrated as illustrated in FIG. 5.

FIG. 6 is a diagram illustrating an example of amplitudes corresponding to the heads HD and the arms AM in a case where the HDA 10 is vibrated as illustrated in FIG. 5. In FIG. 6, the ordinate axis indicates the amplitude, and the abscissa axis indicates the heads HD and the arms AM corresponding to the respective amplitudes. In FIG. 6, the amplitudes corresponding to the heads HD and the arms AM are each normalized using a particular value. Thus, in FIG. 6, the amplitudes corresponding to the heads HD and the arms AM fluctuate between a particular value with a positive polarity, for example, 1, and a particular value with a negative polarity, for example, −1. In FIG. 6, for the amplitude, the maximum value with the positive polarity is 1, and the maximum value with the negative polarity is −1. Here, the negative polarity is opposite to the positive polarity.

As illustrated in FIG. 5, if the synchronous resonance mode occurs, a plurality of amplitudes corresponding to the respective front surface heads HDs have the same polarity. In this case, a plurality of amplitudes corresponding to the respective back surface heads HDb have the same polarity. Furthermore, if the synchronous resonance mode occurs, the polarity of the amplitude corresponding to each front surface head HDs is opposite to the polarity of the amplitude corresponding to each back surface head HDb. In the example illustrated in FIG. 6, an amplitude AP60 corresponding to the head HD0 and the arm AM0 is the same as an amplitude AP62 corresponding to the head HD2 and the arm AM2, and an amplitude AP61 corresponding to the head HD1 and the arm AM1 is the same as an amplitude AP63 corresponding to the head HD3 and the arm AM3. Each of the amplitudes AP60 and AP62 has the same magnitude as that of each of the amplitudes AP61 and AP63. The amplitude AP60 and the amplitude AP62 have the positive polarity, and the amplitude AP61 and the amplitude AP63 have the negative polarity. In other words, the polarity of each of the amplitude AP60 and the amplitude AP62 is opposite to the polarity of each of the amplitude AP61 and the amplitude AP63.

The driver IC 20 controllably drives the SPM 13 and VCM 14 under the control of the system controller 130 (specifically, the MPU 50 described below). The driver IC 20 comprises an SPM controller 21 and a VCM controller 22. The SPM controller 21 controls rotation of the SPM 13. The VCM controller 22 controllably drives the VCM 14 by controlling a supplied current. Functions of the driver 20 may be provided in the system controller 130.

The head amplifier IC (preamplifier) 30 amplifies a read signal read from the disk DK and outputs the amplified read signal to the system controller 130 (specifically, a read/write (R/W) channel 40 described below). The head amplifier IC 30 also outputs, to the head HD, a write current corresponding to a signal output from the R/W channel 40. The head amplifier IC 30 comprises a head selector 31 and a signal detector 32. The head selector 31 selects the head that executes read/write processing, from the plurality of heads HD under the control of the system controller 130 (specifically, the MPU 50 described below). The signal detector 32 detects a signal to be written by the write head and a signal read by the read head. Functions of the head amplifier IC 30 may be provided in the system controller 130.

The volatile memory 70 is a semiconductor memory from which saved data is lost if power supply is disrupted. The volatile memory 70 stores, for example, data needed for processing in each unit of the magnetic disk device 1. The volatile memory 70 is, for example, a Dynamic Random Access Memory (DRAM) or a Synchronous Dynamic Random Access Memory (SDRAM).

The buffer memory 80 is a semiconductor memory in which, for example, data transmitted and received between the magnetic disk device 1 and the host 100 is temporarily recorded. The buffer memory 80 may be configured integrally with the volatile memory 70. The buffer memory 80 is, for example, a DRAM, a Static Random Access Memory (SRAM), an SDRAM, a Ferroelectric Random Access Memory (FeRAM), or a Magnetoresistive Random Access Memory.

The nonvolatile memory 90 is a semiconductor memory in which saved data is recorded even if power supply is disrupted. The nonvolatile memory 90 is, for example, a NOR or NAND flash ROM (Flash Read Only Memory: FROM).

The system controller (controller) 130 is implemented using, for example, a large-scale integrated circuit (LSI) referred to as a System-on-a-Chip (SoC) and comprising a plurality of elements integrated together on a single chip. The system controller 130 includes the read/write (R/W) channel 40, the microprocessor (MPU) 50, and a hard disk controller (HDC) 60. The system controller 130 is electrically connected to the driver IC 20, the head amplifier IC 30, the volatile memory 70, the buffer memory 80, the nonvolatile memory 90, and the host system 100. The system controller 130 may comprise the SPM controller 21, the VCM controller 22, the head selector 31, and the signal detector 32. Furthermore, the system controller 130 may comprise the driver IC 20 and the head amplifier IC 30.

The R/W channel 40 executes signal processing on read data transferred from the disk DK to the host 100 and on write data transferred from the host 100, in accordance with instructions from the MPU 50, described below. The R/W channel 40 comprises a circuit or a function to measure signal quality of read data. The R/W channel 40 is electrically connected to, for example, the head amplifier IC 30, the MPU 50, and the HDC 60.

The MPU 50 is a main controller controlling each unit of the magnetic disk device 1 in accordance with instructions from the host 100 and the like. The MPU 50 controls the actuator AC via the driver IC 20 to perform servo control for positioning the head HD. The MPU 50 controls an operation of writing data to the disk DK and selects a destination to which write data is to be saved. The MPU 50 also controls an operation of reading data from the disk DK and controllably process read data. The MPU 50 is connected to each unit of the magnetic disk device 1. The MPU 50 is electrically connected to, for example, the driver IC 20, the R/W channel 40, and the HDC 60.

The HDC 60 controls the read/write processing and data transfer between the host 100 and the R/W channel 40, in accordance with instructions from the MPU 50. The HDC 60 is electrically connected to, for example, the R/W channel 40, the MPU 50, the volatile memory 70, the buffer memory 80, and the nonvolatile memory 90.

The HDC 60 comprises a head controller 61 and a servo controller 62. The HDC 60 causes these units, for example, the head controller 61 and the servo controller 62 to execute respective types of processing on firmware. The HDC 60 may comprise these units as a circuit. Furthermore, the functions of the HDC 60 may be provided in the MPU 50. For example, the head controller 61 and the servo controller 62 may be provided in the MPU 50.

The head controller 61 controls the head HD that executes the read/write processing. The head controller 61 selects, via the head selector 31, the head HD that executes the read/write processing. The head controller 61 changes the head HD that executes the read/write processing. "Changing the head HD that executes the read/write processing" may be referred to as "head change". To perform a head change, the head controller 61 outputs a signal for a head change to the servo controller 62 described below. If the head HD currently executing the read/write processing (hereinafter referred to as the current head) faces in the direction opposite to the direction in which the head HD to which the current head is to be changed (hereinafter referred to as the next head) faces, the head controller 61 outputs a signal, for example, a flag, which indicates that the current head HD and the next head HD face in the opposite directions (hereinafter referred to as the opposite flag). For example, if the front surface head HDs is changed to the back surface head HDb, the head controller 61 outputs the opposite flag. The head controller 61 also controllably moves the head HD to a particular radial position on the disk DK. If the head HD starts seeking, the head controller 61 outputs, to the servo controller 62, a signal, for example, a flag, which causes the head HD to start seeking (hereinafter referred to as the start flag).

The servo controller 62 controllably places the head HD at a particular position on the disk DK under the control of the head controller 61. The servo controller 62 comprises a tracking controller 621, a seek controller 622, and a disturbance controller 623.

The tracking controller 621 controllably causes the head HD to follow a particular position, for example, a particular track, on the disk during the read/write processing.

The seek controller 622 controls seeking by the head HD. If the seek controller 622, for example, receives the start flag from the head controller 61, the seek controller 622 causes the head HD to start seeking.

The disturbance controller 623 executes a process (hereinafter referred to as the disturbance suppression process) for suppressing adverse effects of disturbance and the like (hereinafter referred to as the disturbance component) on driving by the actuator AC, positioning of the head HD, and the like. For example, the disturbance controller 623 executes a loop shaping process to suppress adverse effects of various types of vibration, for example, the synchronous resonance mode, on driving by the actuator AC, positioning of the head HD, and the like.

Figure 7:
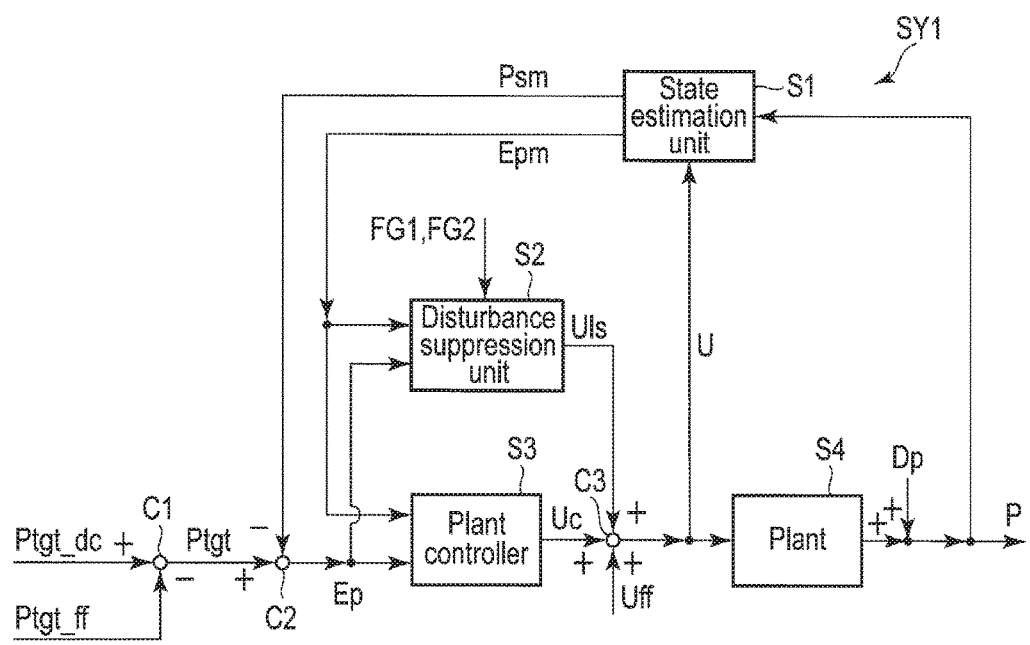
FIG. 7 is a block diagram illustrating an example of a positioning control system of a two-degree-of-freedom control system according to a first embodiment.

FIG. 7 is a block diagram illustrating an example of a positioning control system SY1 of a two-degree-of-freedom control system according to the first embodiment. FIG. 7 illustrates a control system performing feed-forward seek.

The magnetic disk device 1 comprises a plant control system (positioning control system) SY1 for positioning the head HD. The positioning control system SY1 comprises a state estimation unit S1, a disturbance suppression unit S2, a plant controller S3, a plant S4, and calculation units C1, C2, and C3. In an example, the state estimation unit S1, the disturbance suppression unit S2, the plant controller S3, and the calculation units C1 to C3 are provided in the servo controller 62. The plant S4 corresponds to, for example, the head HD and the actuator AC. The positioning control system SY1 performs feedback control for the two-degree-of-freedom control system.

The state estimation unit S1 is a state observer comprising a model of the plant S4 (hereinafter referred to as the plant model) and an internal state variable. The state estimation unit S1 estimates a target position (hereinafter referred to as the estimated position) Psm of the plant S4 on the disk DK in a sample of servo next to the current servo of the plant S4 (hereinafter referred to as the next sample) based on the plant model, the internal state variable, a driving amount U for the plant S4 (hereinafter referred to as the actual driving amount U), and the position P of the plant S4 on the current disk DK (hereinafter referred to as the actual position P). The state estimation unit S1 calculates an error (hereinafter referred to as the model position error) Epm between the actual position P and the position of the plant S4 in the plant model corresponding to the actual position P based on the plant model, the internal state variable, the actual driving amount U, and the actual position P. The state estimation unit S1 performs observer control to prevent an increase in model position error Epm and updates the internal state variable for each sample of servo for the plant S4.

The disturbance suppression unit S2 executes a disturbance suppression process, for example, a loop shaping process. The disturbance suppression unit S2 generates a signal Uls suppressing a disturbance component (hereinafter referred to as the suppression amount Uls) based on the model position error Epm and an error Ep between a target position Ptgt and the estimated position Psm (hereinafter referred to as the estimated position error Ep).

The plant controller S3 executes a process other than the disturbance suppression process, for example, controls the plant S4. The plant controller S3, for example, generates a driving amount Uc for the plant S4 based on the model position error Epm and the estimated position error Ep. The plant controller S3 may, for example, generate the driving amount Uc based on values other than the model position error Epm and the estimated position error Ep.

The plant S4 is driven based on the actual driving amount U.

In the HDC 60, if a particular position on the disk DK is specified from which data is to be read or to which data is to be written (hereinafter referred to as the specified position), the calculation unit C1 receives a correct position Ptgt_ff which corrects a specified position Ptgt_dc based on feedback control and a specified position Ptgt_dc based on feed-forward control. The correction position Ptgt_ff is, for example, 0 if the head HD is tracking a particular track, and varies over time if the head HD is seeking. The calculation unit C1 adds the correction position Ptgt_ff to the specified position Ptgt_dc and outputs the resultant target position Ptgt to the calculation unit C2.

The state estimation unit S1 receives the actual driving amount U and the actual position P corresponding to the position of the plant S4 to which a disturbance Dp is added. The state estimation unit S1 outputs the estimated position Psm to the calculation unit C2, and outputs the model position error Epm to the disturbance suppression unit S2 and the plant controller S3. The calculation unit C2 receives the target position Ptgt and the estimated position Psm. The calculation unit C2 reduces the estimated position Psm from the target position Ptgt and outputs the resultant estimated position error Ep to the disturbance suppression unit S2 and the plant controller S3. If the feed-forward control is not performed, the calculation unit C2 receives, instead of the target position Ptgt, a target speed of the head HD, an estimated speed estimated by the state estimation unit S1, and the like. The calculation unit C2 reduces the estimated speed from the target speed and outputs a resultant estimated speed error to the disturbance suppression unit S2 and the plant controller S3.

The disturbance suppression unit S2 receives the model position error Epm and the estimated position error Ep. For example, if a head change is performed, the disturbance suppression unit S2 receives an opposite flag FG1 and a start flag FG2 from the head controller 61. The disturbance suppression unit S2 outputs the suppression amount Uls to the calculation unit C3.

The plant controller S3 receives the model position error Epm and the estimated position error Ep. The plant controller S3 outputs the driving amount Uc to the calculation unit C3. If the feed-forward control is not performed, the plant controller S3 receives a target acceleration for the head HD and the like. The calculation unit C3 receives the driving amount Uc, the suppression amount Uls, and a signal (hereinafter referred to as the correction amount) Uff which corrects the driving amount Uc based on the feed-forward control. The calculation unit C3 outputs, to the plant S4, the actual driving amount U, corresponding to the sum of the driving amount Uc, the suppression amount Uls, and the correction amount Uff. The plant S4 is driven in accordance with the actual driving amount U to move to the actual position P, that is, the position corresponding to the actual driving amount U and to which the disturbance Dp is added. The actual driving amount U, the driving amount Uc, the suppression amount Uls, and the correction amount Uff correspond to, for example, values of currents driving the VCM 14.

Figure 8:
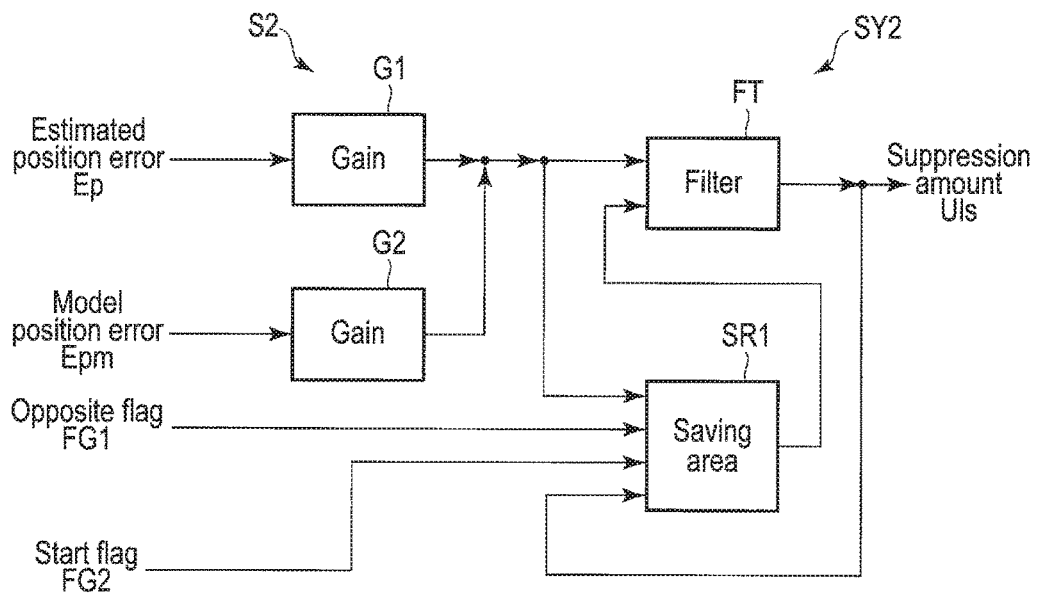
FIG. 8 is block diagram illustrating an example of a disturbance suppression processing system.

FIG. 8 is a block diagram illustrating an example of a disturbance suppression processing system SY2.

The disturbance suppression unit S2 comprises the disturbance suppression processing system SY2, which executes the disturbance suppression process. The disturbance suppression system SY2 comprises a gain G1, a gain G2, a filter FT, and a saving area SR1. The saving area SR1 may be, for example, a memory.

The gain G1 receives the estimated position error Ep. The gain G1 multiplies the estimated position error Ep by a variable gain to output the result to the filter FT and the saving area SR1. The gain G2 receives the model position error Epm. The gain G2 multiplies the model position error Epm by a variable gain to output the result to the filter FT and the saving area SR1.

The filter FT includes a coefficient which suppresses a particular frequency component of an input signal. The filter FT generates the current suppression amount Uls by executing the disturbance suppression process, for example, the loop shaping process, based on the currently input estimated position error Ep, the currently input model position error Epm, a previously input estimated position error Ep, a previously input model position error Epm, a previously output suppression amount Uls, and the like. The "currently input estimated position error" is hereinafter referred to as the "current estimated position error", the "currently input model position error" is hereinafter referred to as the "current model position error", the "previously input estimated position error" is hereinafter referred to as "previous estimated position error", the "previously input model position error" is hereinafter referred to as the "previous model position error", and the "previously output suppression amount" is hereinafter referred to as the "previous suppression amount". For convenience of description, the "previous estimated position error" and the "previous model position error" may hereinafter be collectively referred to as the "past input values", and the "previous suppression amount" may hereinafter be referred to as the "past output value". Furthermore, the "past input values", and "previous suppression amount" may hereinafter be collectively referred to as the "past values". The filter FT outputs the current suppression amount Uls to the saving area SR1 and the calculation unit C3 illustrated in FIG. 7. The filter FT is a loop shaping filter, for example, a finite impulse response (FIR) filter or an infinite impulse response (IIR) filter.

The saving area SR1 has the past values recorded therein. The saving area SR1 outputs the past values to the filter FT. If the opposite flag FG1 and the start flag FG2 are input to the saving area SR1, the saving area SR1 inverts the polarities of the past values to output the resultant values to the filter FT. For example, if the filter FT is an IIR filter and the opposite flag FG1 and the start flag FG2 are input to the saving area SR1, the saving area SR1 inverts the polarities of the past input values to output the resultant values to the filter FT. Furthermore, if the filter FT is an FIR filter and the opposite flag FG1 and the start flag FG2 are input to the saving area SR1, the saving area SR1 inverts the polarities of the past input values to output the resultant values to the filter FT. In other words, if the opposite flag FG1 and the start flag FG2 are input to the saving area SR1, the saving area SR1 multiples the past values by the ratio of the amplitude of the front surface head HDs to the amplitude of the back surface head HDb or the ratio (gain) of the amplitude of the back surface head HDb to the amplitude of the front surface head HDs to output the resultant values to the filter FT. In an example, if the opposite flag FG1 and the start flag FG2 are input to the saving area SR1, the saving area SR1 multiples the past values by the ratio (−1) of an amplitude AP60 (1) of the front surface head HD0 to an amplitude AP61 (−1) of the head HD1, illustrated in FIG. 6, and outputs the resultant values to the filter FT. The saving area SR1 is capable of outputting past values with waveforms with particular phases. For example, when a head change is performed, and if a phase shift occurs between a waveform preceding the head change and a waveform succeeding the head change, the saving area SR1 may output, to the filter FT, past values with shifted phases corresponding to the phase shift having occurred.

Figure 9:
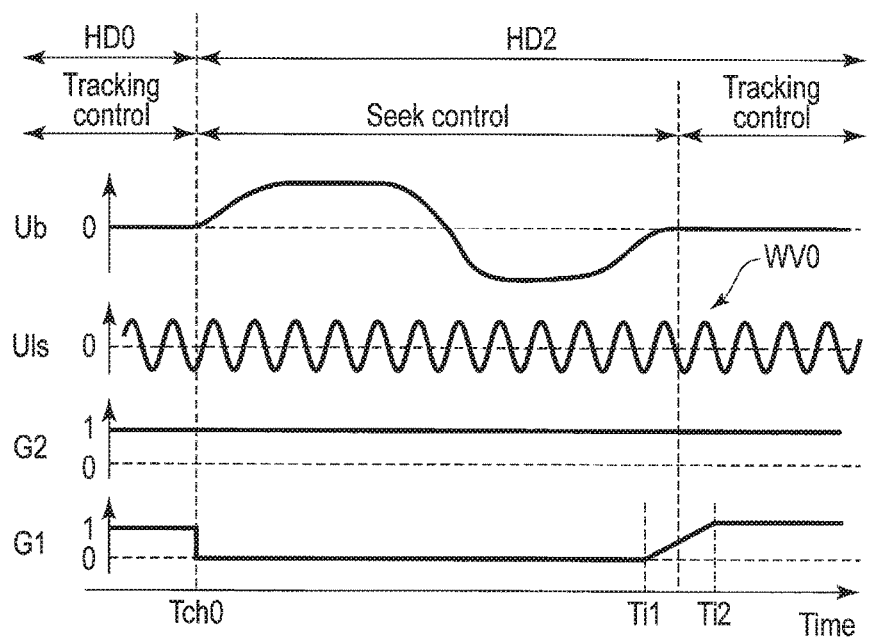
FIG. 9 is a diagram illustrating an example of a disturbance suppression process.

FIG. 9 is a diagram illustrating an example of the disturbance suppression process. In FIG. 9, the abscissa axis indicates time. In FIG. 9 a driving amount Ub indicates a current value corresponding to a driving amount of the plant S4 which is equal to the actual driving amount U from which the suppression amount Uls is excluded. As illustrated in FIG. 9, the suppression amount Uls has a waveform WV0 which suppresses disturbance components. In the example illustrated in FIG. 9, the waveform WV0 is a sine wave having a constant amplitude and a constant wavelength. FIG. 9 illustrates variable gains applied by the gain G1 and the gain G2 illustrated in FIG. 8. For convenience of description, the variable gains applied by the gain G1 and the gain G2 may be respectively referred to as the gain G1 and the gain G2. In FIG. 9, a timing Tch0 indicates a timing when the head HD0 is changed to the head HD2, a timing Ti1 indicates a timing when the head HD2 starts settling at a particular track, and a timing Ti2 indicates a timing when the head HD2 completes settling at the particular track.

In the example illustrated in FIG. 9, if the system controller 130 changes the head HD0 to the head HD2 at the timing Tch0, the system controller 130 starts causing the head HD2 to seek a particular track at the timing Tch0. The system controller 130 starts increasing the driving amount Ub at the timing Tch0 to accelerate the head HD2, and reduces the driving amount Ub over time to decelerate the head HD2 consistently with the distance to the particular track. The system controller 130 multiplies the model position error Epm by the gain G2, for example, 1. The system controller 130 multiplies the estimated position error Ep by a gain G1 of 0 from the timing Tch0 through the timing Ti1 and multiplies, from the timing Ti1 through the timing Ti2, by a gain G1 increasing from 0 to 1 over time. The system controller 130 also suppresses the disturbance components using the suppression amount Uls with the waveform WV0.

Figure 10:
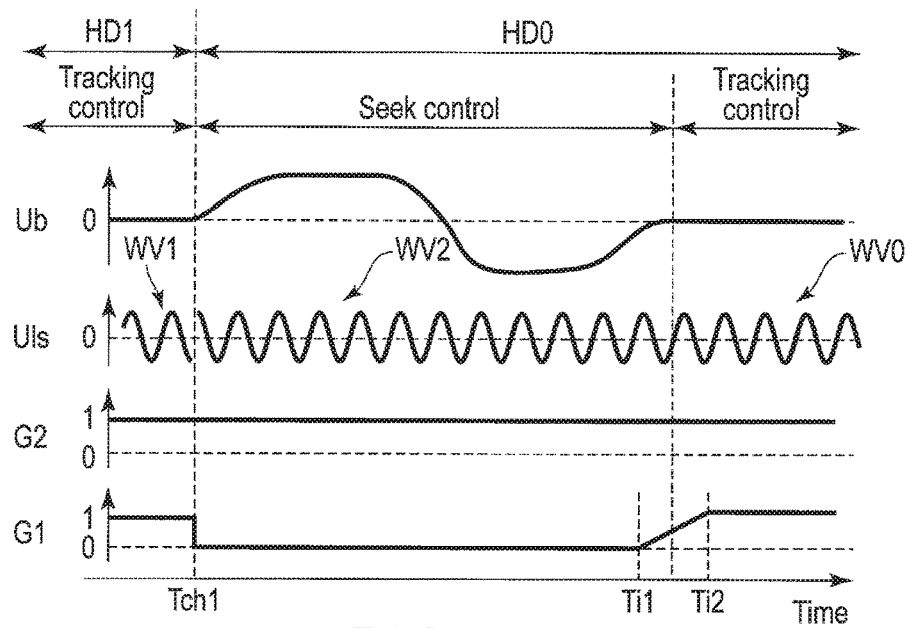
FIG. 10 is a diagram illustrating an example of the disturbance suppression process.

FIG. 10 is a diagram illustrating an example of the disturbance suppression process. In FIG. 10, the timing Tch1 indicates a timing when the head HD0 is changed to the head HD1.

In the example illustrated in FIG. 10, if the system controller 130 changes the head HD1 to the head HD0 at the timing Tch1, the system controller 130 causes the head HD2 to start seeking a particular track at the timing Tch1. In the waveform WV0 of the suppression amount Uls, the system controller 130 inverts the polarity of a waveform WV2 succeeding the timing Tch1 (hereinafter referred to as the succeeding waveform WV2) with respect to the polarity of a waveform WV1 preceding the timing Tch1 (hereinafter referred to as the preceding waveform WV1). In other words, the system controller 130 multiplies the suppression amount Uls succeeding the timing Tch1 by the ratio (−1) of the amplitude (1) of the head HD0 to the amplitude (−1) of the head HD1, illustrated in FIG. 6. The system controller 130 outputs the suppression amount Uls with the succeeding waveform WV2 that is discontinuous with the preceding waveform WV1. If, with the synchronous resonance mode occurring, the front surface head HDs is changed to the back surface head HDb or the back surface head HDb is changed to the front surface head HDs, the system controller 130 can suppress the adverse effects of the synchronous resonance mode during seeking by the next head HD by inverting the succeeding waveform WV2 as illustrated in FIG. 10.

Figure 11:
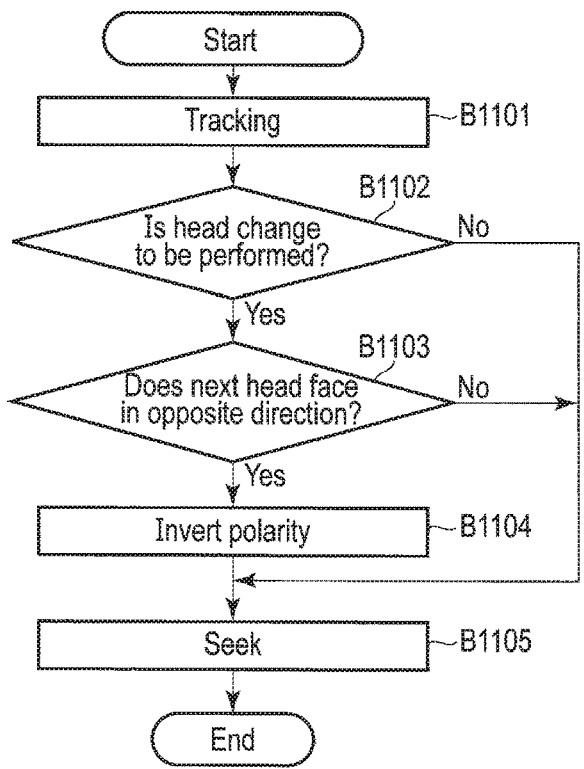
FIG. 11 is a flowchart illustrating an example of the disturbance suppression process.

FIG. 11 is a flowchart illustrating an example of the disturbance suppression process.

The system controller 130 causes the head HD to track a particular track in accordance with an instruction from the host 100 (B1101). The system controller 130 determines whether or not to perform a head change (B1102). In a case of not performing a head change (NO in B1102), the system controller 130 proceeds to processing in B1105. In a case of performing a head change (B1102), the system controller 130 determines whether or not the next head faces in the direction opposite to the direction in which the current head HD faces (B1103). In a case of determining that the next head does not face in the direction opposite to the direction in which the current head HD faces (NO in B1103), the system controller 130 proceeds to processing in B1105. In a case of determining that the next head faces in the direction opposite to the direction in which the current head HD faces (YES in B1103), the system controller 130 inverts the polarity of the succeeding waveform WV2 (31104). The system controller 130 causes the head HD to seek a particular track (B1105), and ends the process.

According to the present embodiment, if the next head HD faces in the direction opposite to the direction in which the current head HD faces, the magnetic disk device 1 inverts the polarity of the succeeding waveform WV2. Thus, if, with the synchronous resonance mode occurring, the front surface head HDs is changed to the back surface head HDb or the back surface head HDb is changed to the front surface head HDs, the system controller 130 can suppress the adverse effects of the synchronous resonance mode during seeking by the next head HD by inverting the succeeding waveform WV2. Therefore, the magnetic disk device 1 is capable of improving the accuracy of the servo control.

Now, magnetic disk devices according to modifications and other embodiments will be described. In the modifications and the other embodiments, the same components as those of the above-described embodiment are denoted by the same reference numerals and will not be described in detail.

(Modification 1)

The magnetic disk device 1 according to Modification 1 is different from the magnetic disk device 1 according to the above-described embodiment in the configuration of the disturbance suppression system SY2.

Figure 12:
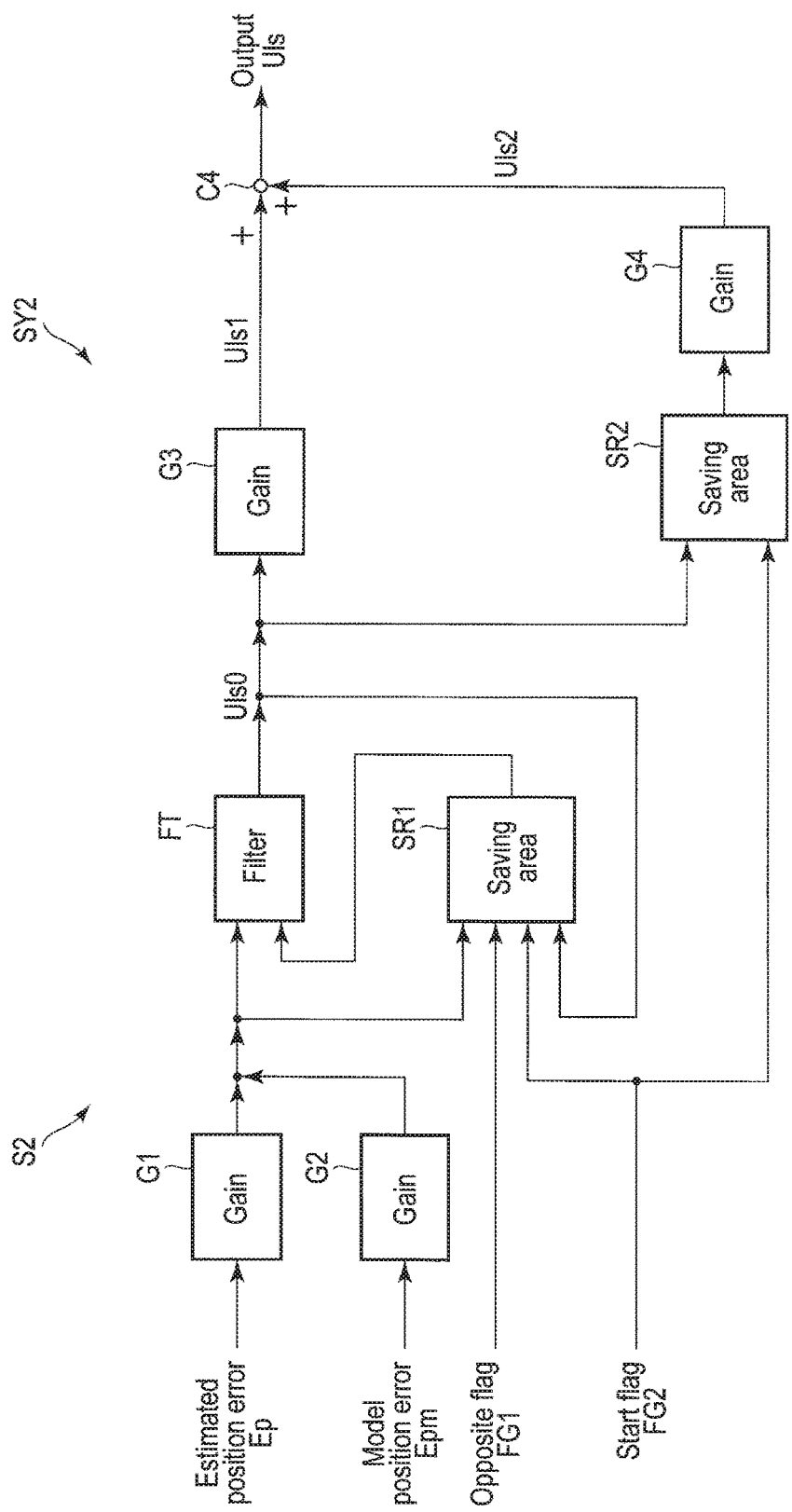
FIG. 12 is a block diagram illustrating an example of a disturbance suppression processing system according to Modification 1.

FIG. 12 is a block diagram illustrating an example of the disturbance suppression system SY2 according to Modification 1.

The disturbance suppression system SY2 further comprises a gain G3, a gain G4, a saving area SR2, and a calculation unit C4. The saving area SR2 may be, for example, a memory.

The filter FT calculates and outputs a suppression amount Uls0 to the saving area SR1, the gain G3, and the saving area SR2. The suppression amount Uls0 corresponds to the suppression amount Uls illustrated in FIG. 8. The gain G3 receives the suppression amount Uls0. The gain G3 multiplies the suppression amount Uls0 by the variable gain to output a resultant suppression amount Uls1 to the calculation unit C4.

The saving area SR2 has the suppression amount Uls0 and the like recorded therein. If the start flag FG2 is input to the saving area SR2, the saving area SR2 outputs, to the gain G4, the suppression amount Uls0 at the timing of a head change, that is, the timing of the start of seeking by next head HD. The gain G4 multiplies, by the variable gain, the suppression amount Uls0 at the timing of the head change to output a resultant suppression amount Uls2 to the calculation unit C4. The calculation unit C4 adds the suppression amount Uls2 to the suppression amount Uls1 to output the resultant suppression amount Uls to the calculation unit C3 illustrated in FIG. 7.

FIG. 13 is a diagram illustrating an example of a disturbance suppression process according to Modification 1. The driving amount Ub, the gain G1, and the gain G2 are the same as those in FIG. 10 and are thus omitted from FIG. 13. FIG. 13 illustrates the start flag FG2 illustrated in FIG. 12. If the start flag FG2 has a value of larger than 0 (hereinafter referred to as High), seeking by the next head is started. FIG. 13 illustrates a flag FG3. The flag FG3 specifies a period (hereinafter referred to as the switching time) dT when a process (hereinafter referred to as the continuous-waveform process) is executed such that the waveform WV1 of the suppression amount Uls0 preceding the waveform WV0 thereof is continuous with the waveform WV2 of the suppression amount Uls0 succeeding the waveform WV0. Here, two continuous waveforms include not only two connected waveforms but also two waveforms which are discontinuous to the degree that the waveforms are considered to be substantially connected together. If the flag FG3 is High, the continuous-waveform process is executed. If the flag FG3 is 0 (hereinafter referred to as Low), the continuous-waveform process is not executed. The switching time dT may be optionally determined based on a seek condition for the next head HD such as a seek distance or a seek speed or may be recorded in the memory, for example, the nonvolatile memory 90, as a table in accordance with the seek condition. FIG. 13 illustrates variable gains applied by the gain G3 and the gain G4 illustrated in FIG. 12. For convenience of description, the variable gains applied by the gain G3 and the gain G4 may be respectively referred to as the gain G3 and the gain G4.

In the example illustrated in FIG. 13, at the timing Tch1, when the start flag FG2 is High, the system controller 130 changes the head HD1 to the head HD0 to cause the head HD0 to start seeking. For the waveform WV0 of the suppression amount Uls0, the system controller 130 inverts the polarity of the succeeding waveform WV2 of the suppression amount Uls0. The system controller 130 executes the continuous-waveform process on the preceding waveform WV1 and the succeeding waveform WV2 during the switching time dT from the timing Tch1 until a timing To1 when the start flag FG2 is Low. The system controller 130 generates the suppression amount Uls1 by multiplying the succeeding waveform WV2 by the gain G3 increasing, for example, from 0 to 1 over time during the switching time dT. The system controller 130 generates the suppression amount Uls2 by multiplying the amplitude A1 of the preceding waveform WV1 at the timing Tch1 by the gain G4 decreasing, for example, from 1 to 0 over time during the switching time dT. The system controller 130 adds the suppression amount Uls2 to the suppression amount Uls1 to generate the suppression amount Uls including the preceding waveform WV1 and the succeeding waveform WV2 continuous with each other.

Figure 14:
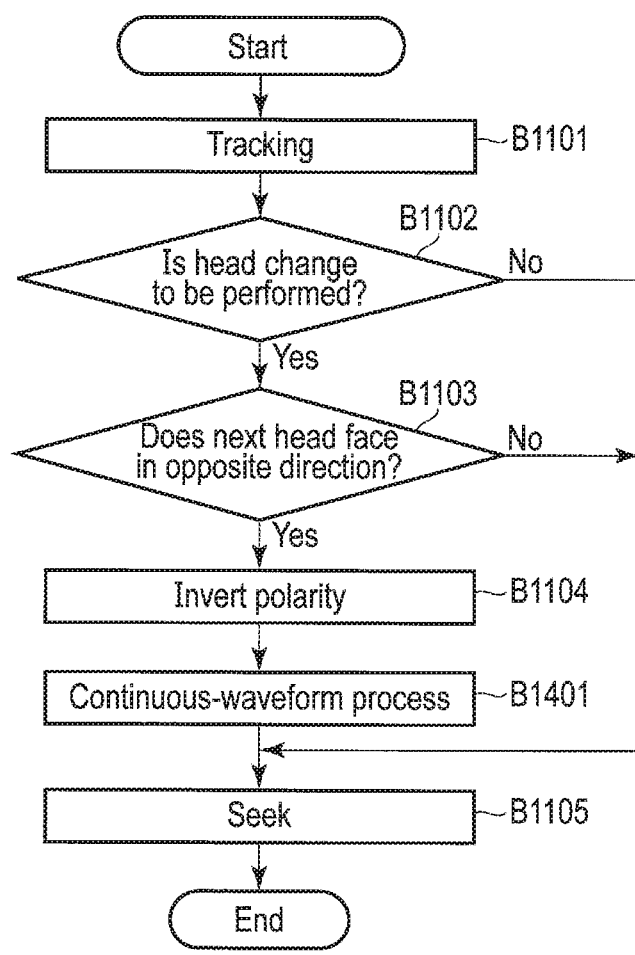
FIG. 14 is a flowchart illustrating an example of the disturbance suppression process according to Modification 1.

FIG. 14 is a flowchart illustrating an example of a disturbance suppression process according to Modification 1.

The system controller 130 causes the head HD to track a particular track (B1101), determines whether or not to perform a head change (B1102), determines whether or not the next head faces in the direction opposite to the direction in which the current head HD faces (B1103), and inverts the polarity of the succeeding waveform WV2 (B1104). The system controller 130 executes the continuous-waveform process on the suppression amount Uls0 (B1401). For example, the system controller 130 generates the suppression amount Uls1 by multiplying the succeeding waveform WV2 by the gain G3 increasing, for example, from 0 to 1 over time during the switching time dT. The system controller 130 generates the suppression amount Uls2 by multiplying the amplitude A1 of the preceding waveform WV1 at the timing Tch1 by the gain G4 decreasing, for example, from 1 to 0 over time during the switching time dT. The system controller 130 adds the suppression amount Uls2 to the suppression amount Uls1 to generate the suppression amount Uls including the preceding waveform WV1 and the succeeding waveform WV2 continuous with each other. The system controller 130 causes the head HD to seek a particular position (B1105) to end the process.

According to Modification 1, if the next head HD faces in the direction opposite to the direction in which the current head faces, the magnetic disk device 1 can invert the polarity of the succeeding waveform WV2 to adjustably make the preceding waveform WV1 continuous with the succeeding waveform WV2. The magnetic disk device 1 generates the suppression amount Uls1 by multiplying the succeeding waveform WV2 by the gain G3 increasing over time during the switching time dT and generates the suppression amount Uls2 by multiplying the amplitude A1 of the preceding waveform WV by the gain G4 decreasing over time during the switching time dT. The magnetic disk device 1 is capable of adding the suppression amount Uls2 to the suppression amount Uls1 to output the suppression amount Uls comprising the waveform WV0 including the preceding waveform WV1 and the succeeding waveform WV2 continuous with each other. In other words, the magnetic disk device 1 is capable of inverting the polarity of the succeeding waveform WV2 to output the suppression amount Uls including the preceding waveform WV1 and the succeeding waveform WV2 smoothly connected together. Thus, the magnetic disk device is capable of preventing a rapid change in acceleration and jerk of the head HD immediately after a head change.

(Modification 2)

The magnetic disk device 1 according to Modification 2 is different from the magnetic disk device according to the above-described embodiment in the configuration of the disturbance suppression processing system SY2.

FIG. 15 is a block diagram illustrating an example of the disturbance suppression processing system SY2 according to Modification 2.

Compared to the disturbance suppression processing system SY2 illustrated in FIG. 12, the disturbance suppression processing system SY2 according to Modification 2 does not comprise the saving area SR2.

The filter FT calculates and outputs the suppression amount Uls0 to the gain G3 and the gain G4. The gain G3 receives the suppression amount Uls0. The gain G3 multiplies the suppression amount Uls0 by the variable gain to output the resultant suppression amount Uls1 to the calculation unit C4. The gain G4 receives the suppression amount Uls0. The gain G4 multiplies the suppression amount Uls0 by the variable gain to output resultant suppression amount Uls2 to the calculation unit C4. The calculation unit C4 adds the suppression amount Uls2 to the suppression amount Uls1 to output the resultant suppression amount Uls to the calculation unit C3 illustrated in FIG. 7.

Figure 16:
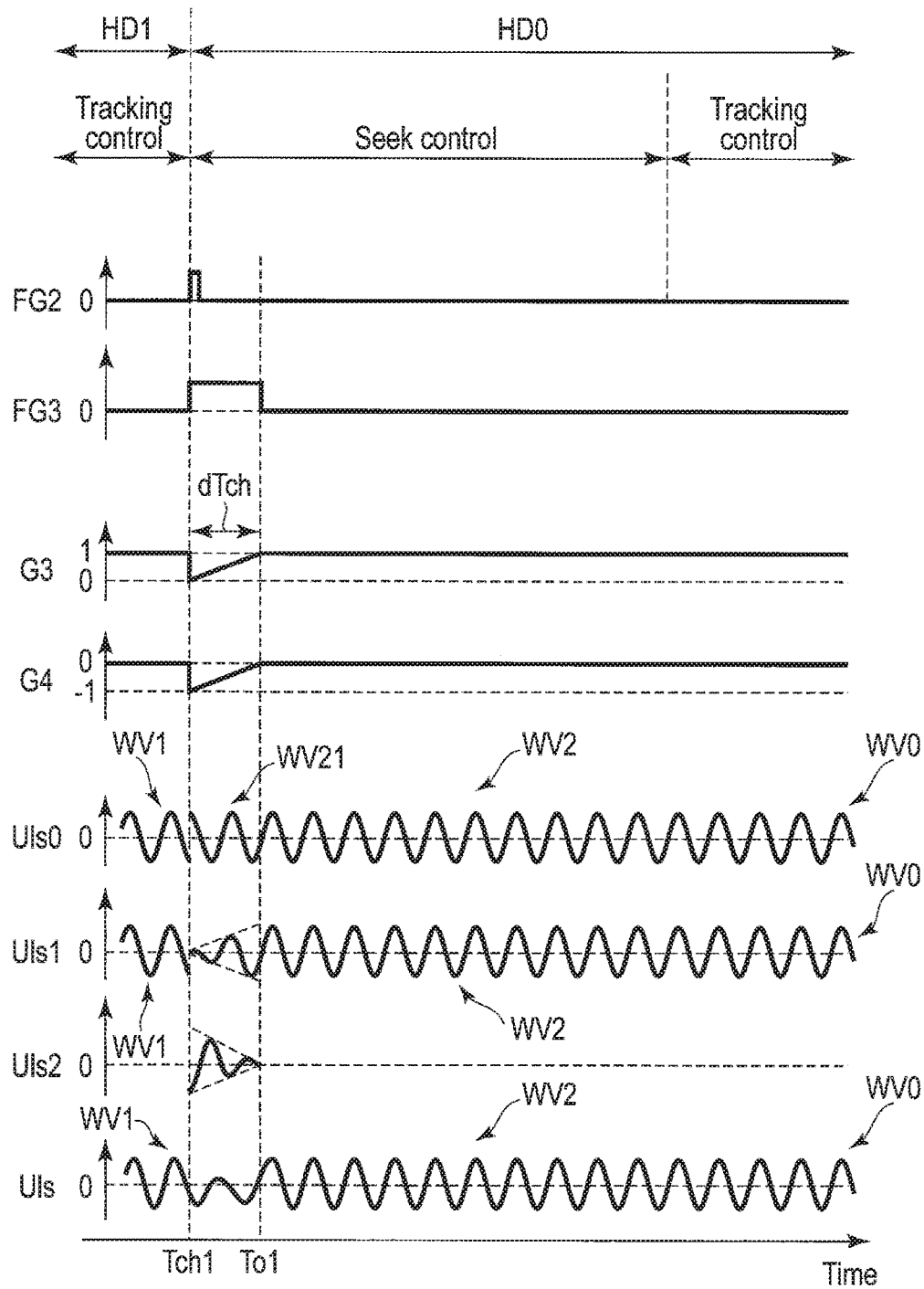
FIG. 16 is a diagram illustrating an example of a disturbance suppression process according to Modification 2.

FIG. 16 is a diagram illustrating an example of a disturbance suppression process according to Modification 2. The driving amount Ub, the gain G1, and the gain G2 are the same as those in FIG. 10 and are thus omitted from FIG. 16.

In the example illustrated in FIG. 16, the system controller 130 generates the suppression amount Uls2 by multiplying, by the gain G4 increasing from −1 to 0 over time, a partial waveform WV21 of the succeeding waveform WV2 corresponding to the switching time dT. In other words, the system controller 130 generates the suppression amount Uls2 by inverting the polarity of the waveform WV21 and multiplying the waveform WV21 by the gain G4 increasing, for example, from 0 to 1 over time during the switching time dT. The system controller 130 adds the suppression amount Uls2 to the suppression amount Uls1 to generate the suppression amount Uls including the preceding waveform WV1 and the succeeding waveform WV2 continuous with each other.

According to Modification 2, the magnetic disk device is capable of outputting, using the simple configuration, the suppression amount Uls comprising the waveform WV0 including the preceding waveform WV1 and the succeeding waveform WV2 continuous with each other.

(Modification 3)

The magnetic disk device 1 according to Modification 3 is different from the magnetic disk device according to the above-described embodiment in the configuration of the disturbance suppression processing system SY2.

FIG. 17 is a block diagram illustrating an example of the disturbance suppression processing system SY2 according to Modification 3.

Compared to the disturbance suppression processing system SY2 illustrated in FIG. 15, the disturbance suppression processing system SY2 according to Modification 3 does not comprise the gain G4 or the calculation unit C4.

The filter FT calculates and outputs the suppression amount Uls0 to the gain G3. The gain G3 receives the suppression amount Uls0. The gain G3 multiplies the suppression amount Uls0 by the variable gain to output the resultant suppression amount Uls to the calculation unit C3 illustrated in FIG. 7.

Figure 18:
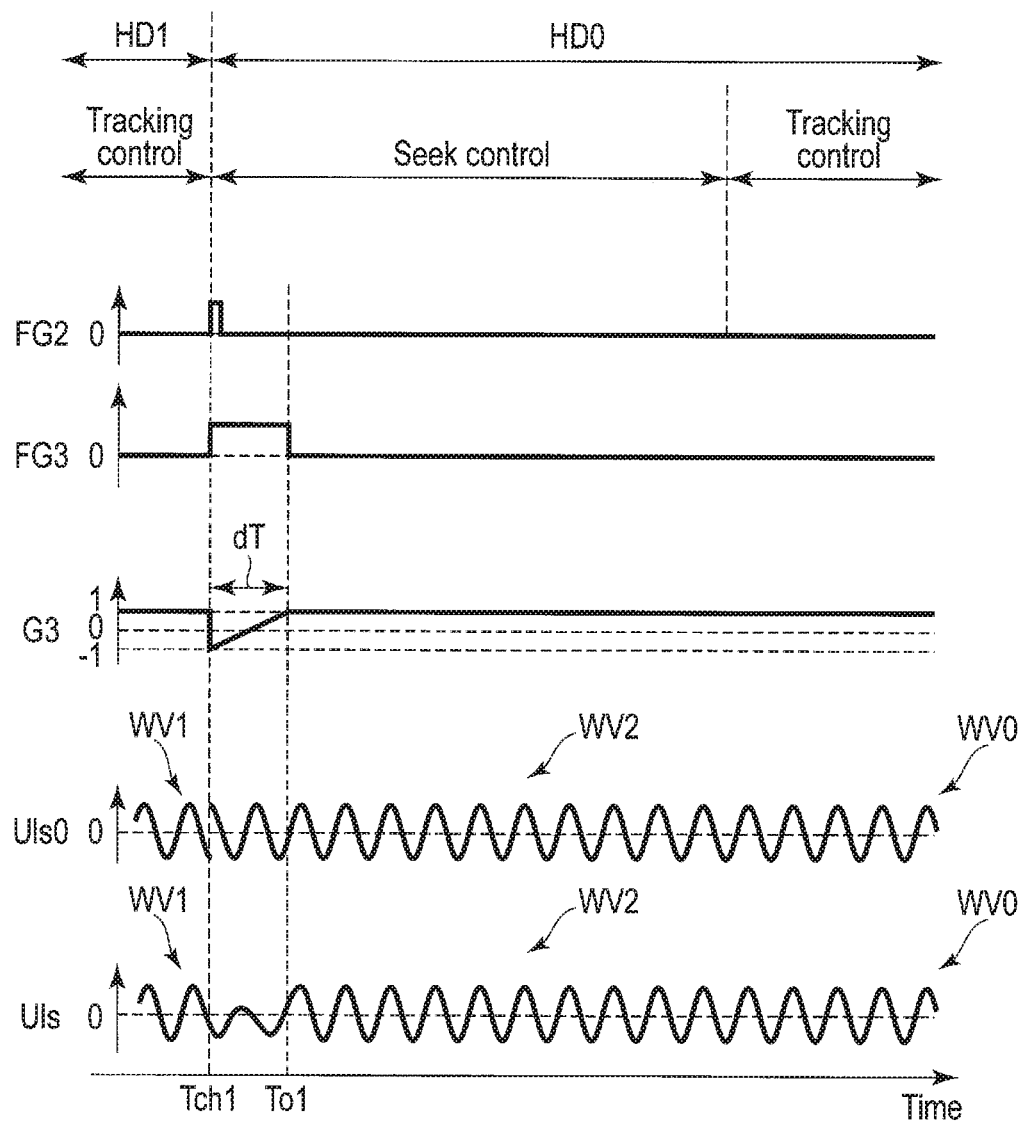
FIG. 18 is a diagram illustrating an example of a disturbance suppression process according to Modification 3.

FIG. 18 is a diagram illustrating an example of a disturbance suppression process according to Modification 3. The driving amount Ub, the gain G1, and the gain G2 are the same as those in FIG. 10 and are thus omitted from FIG. 18.

In the example illustrated in FIG. 18, the system controller 130 generates the suppression amount Uls by multiplying the succeeding waveform WV2 by the gain G3 varying from a particular value with a negative polarity to a particular value with a positive polarity, for example, −1 to 1, over time during the switching time dT. In other words, the system controller 130 generates the suppression amount Uls by inverting the polarity of the succeeding waveform WV2 during the switching time dT to multiply the succeeding waveform WV2 by the gain increasing, for example, from −1 to 0 over time during the switching time dT and the gain increasing, for example, from 0 to 1 over time during the switching time dT.

According to Modification 3, the magnetic disk device is capable of outputting, using the simple configuration, the suppression amount Uls comprising the waveform WV0 including the preceding waveform WV1 and the succeeding waveform WV2 continuous with each other.

Second Embodiment

The magnetic disk device 1 according to a second embodiment is different from the magnetic disk device according to the above-described embodiment in the configuration that can be applied if a resonance mode other than the synchronous resonance mode occurs.

The system controller 130 comprises a function to correct, for a head change, the gains applied to the past values or the phases of the past values in accordance with the resonance mode occurring in the HDA 10 or the like to adjust the suppression amount Uls. For example, the system controller 130 may correct the phases of the past values corresponding to a phase shift having occurred in a system preceding an input to the filter FT or a system succeeding an output from the filter FT. The system controller 130 may also correct a phase shift with respect to the phase of a loop shaping frequency identified in the system preceding the input to the filter FT or the system succeeding the output from the filter FT.

Figure 19:
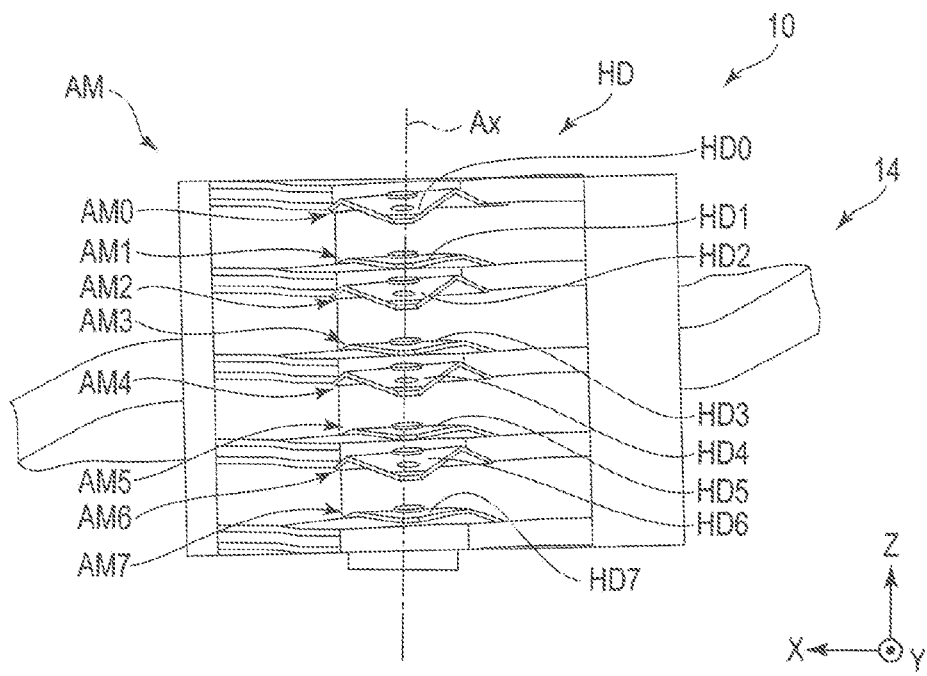
FIG. 19 is a diagram illustrating an example of a state of vibration of the heads, the arms, and a VCM in a case where a resonance mode occurs in the HDA according to a second embodiment.
Figure 20:
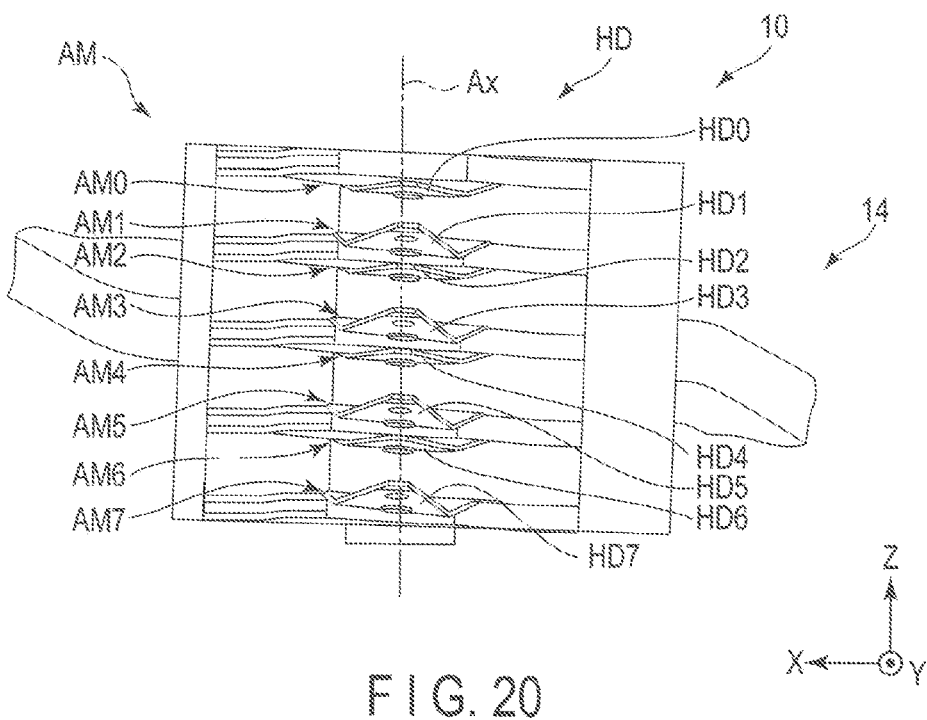
FIG. 20 is a diagram illustrating an example of the state of vibration of the heads, the arms, and the VCM in a case where the resonance mode occurs in the HDA according to the second embodiment.

FIG. 19 and FIG. 20 are diagrams illustrating an example of a state of vibration of the heads HD, the arms AM, and the VCM 14 in a case where the resonance mode occurs in the HDA 10, according to the second embodiment. FIG. 19 and FIG. 20 illustrate the heads HD, the arms AM, and the VCM 14 in a case where an X-Z plane is viewed from a tip of an arrow for the second direction Y in FIG. 2. If the resonance mode illustrated in FIG. 19 and FIG. 20 occurs in the HDA 10, the heads HD, the arms AM, and the VCM 14 may be vibrated in a coupled manner. A direction depicted by the arrow for the first direction X is hereinafter referred to as the left side, and the direction opposite to the left side is hereinafter referred to as the right side. The heads HD, the arms AM, and the VCM 14 illustrated in FIG. 19 are inclined to the left side with respect to the axis AX. The heads HD, the arms AM, and the VCM 14 illustrated in FIG. 20 are inclined to the right side with respect to the axis AX. In FIG. 19 and FIG. 20, the head HD further includes a head HD4, a head HD5, a head HD6, and a head HD7. Furthermore, in FIG. 19 and FIG. 20, the arm AM further includes an arm AM4, an arm AM5, an arm AM5, an arm AM6, and an arm AM7.

In the example illustrated in FIG. 19, the heads HD0 to HD3 are displaced toward the left side with respect to the axis AX. The heads HD4 to HD7 are displaced toward the right side with respect to the axis AX. The heads HD0 to HD7 are arranged in tandem in such a manner as to incline upward to the left with respect to the axis AX.

In the example illustrated in FIG. 20, the heads HD0 to HD3 are displaced toward the right side with respect to the axis AX. The heads HD4 to HD7 are displaced toward the left side with respect to the axis AX. The heads HD0 to HD7 are arranged in tandem in such a manner as to incline upward to the right with respect to the axis AX.

Figure 21:
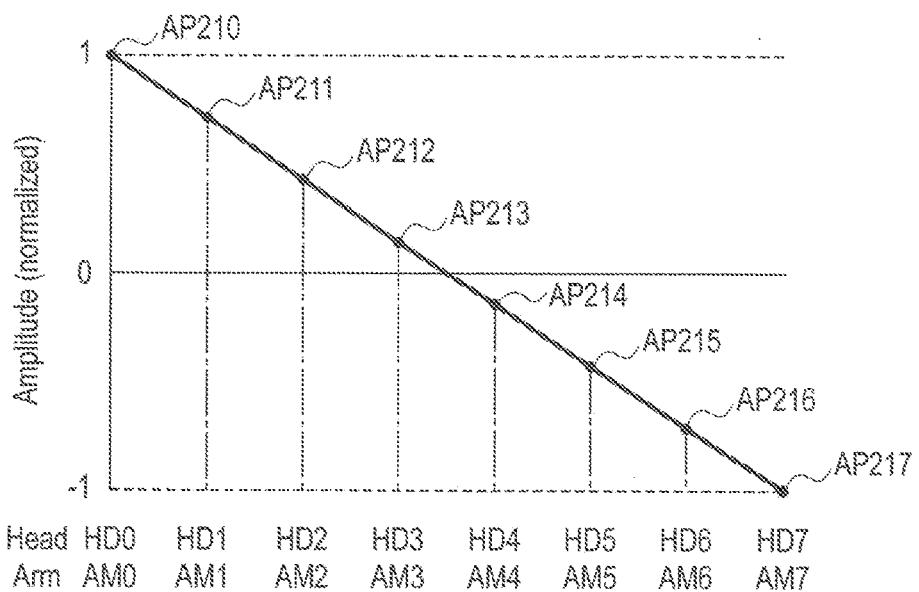
FIG. 21 is a diagram illustrating an example of amplitudes corresponding to the heads and the arms in a case where the HDA is vibrated as illustrated in FIG. 19 and FIG. 20.

FIG. 21 is a diagram illustrating an example of amplitudes corresponding to the heads HD and the arms AM in a case where the HDA 10 is vibrated as illustrated in FIG. 19 and FIG. 20. In FIG. 21, the ordinate axis indicates the amplitude, and the abscissa axis indicates the heads HD and the arms AM corresponding to the respective amplitudes. In FIG. 21, the amplitudes corresponding to the heads HD and the arms AM are each normalized using a particular value. Thus, in FIG. 21, the amplitudes corresponding to the heads HD and the arms AM fluctuate between a particular value with the positive polarity, for example, 1, and a particular value with the negative polarity, for example, −1. In FIG. 21, for the amplitude, the maximum value with the positive polarity is 1, and the maximum value with the negative polarity is −1.

In the example illustrated in FIG. 21, amplitudes AP210 to AP217 for the heads HD0 to HD7 and the arms AM0 to AM7 vary at a constant gradient from the maximum value with the positive polarity (1) to the maximum value with the negative polarity (−1).

If a resonance mode occurs which varies the amplitudes of the heads HD and the arms AM as illustrated in FIG. 21, the system controller 130 executes the disturbance suppression process, for example, the loop shaping process. For example, if the head HD0 is changed to the head HD1, the system controller 130 inputs, to the filter FT, the past values multiplied by the ratio of the amplitude AP210 of the head HD0 to the amplitude AP211 of the head HD1 (AP211/AP210). If the head HD0 is changed to the head HD6, the system controller 130 inputs, to the filter FT, the past values multiplied by the ratio of the amplitude AP210 of the head HD0 to the amplitude AP216 of the head HD6 (AP216/AP210). The system controller 130 generates the suppression amount Uls based on the currently input estimated position error Ep, the currently input model position error Epm, the past values, and the like.

Figure 22:
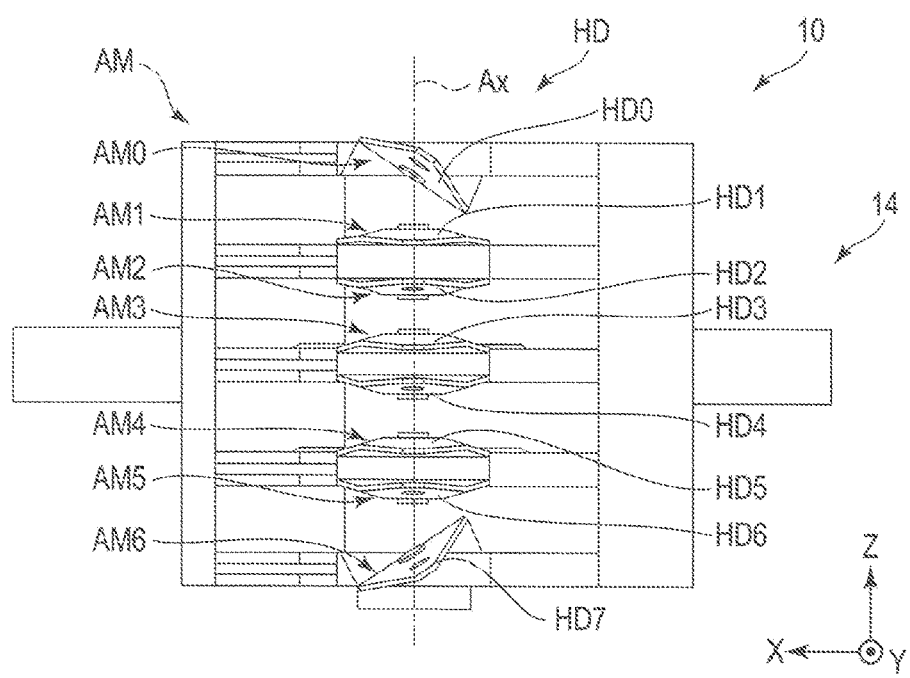
FIG. 22 is a diagram illustrating an example of the state of vibration of the heads, the arms, and the VCM in a case where the resonance mode according to the second embodiment occurs in the HDA.
Figure 23:
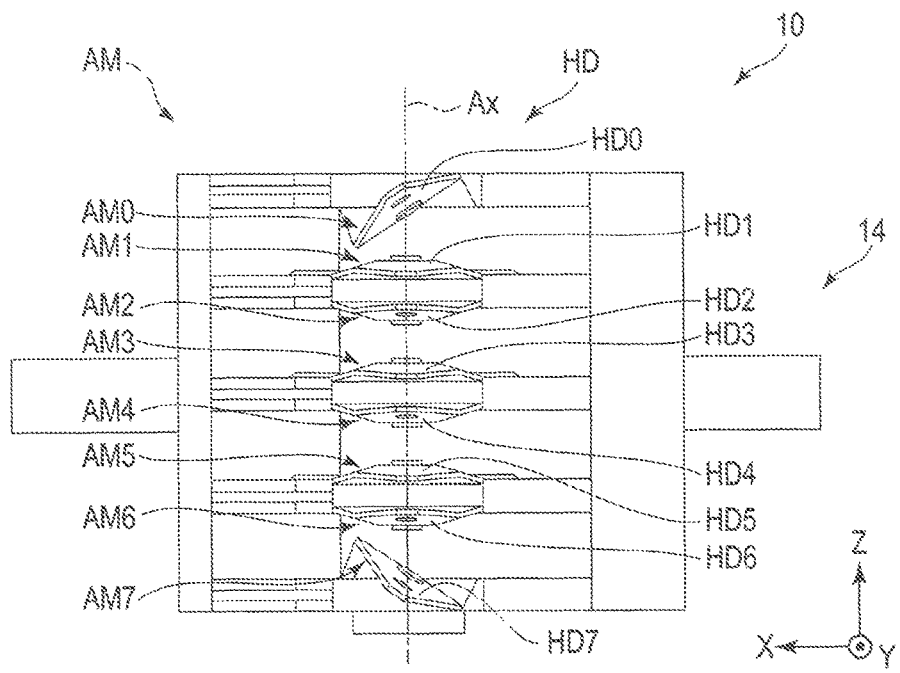
FIG. 23 is a diagram illustrating an example of the state of vibration of the heads, the arms, and the VCM in a case where the resonance mode according to the second embodiment occurs in the HDA.

FIG. 22 and FIG. 23 are diagrams illustrating an example of the state of vibration of the heads HD, the arms AM, and the VCM 14 in a case where the resonance mode according to the second embodiment occurs in the HDA 10. FIG. 22 and FIG. 23 illustrate the heads HD, the arms AM, and the VCM 14 in a case where the X-Z plane is viewed from the tip of the arrow for the second direction Y in FIG. 2.

In the example illustrated in FIG. 22, the head HD0 and the arm AM0 are inclined to the right side with respect to the axis AX. The heads HD1 to HD6 and the arms AM1 to AM6 are not substantially inclined with respect to the axis AX. The head HD7 and the arm AM7 are inclined to the left side with respect to the axis AX.

In the example illustrated in FIG. 23, the head HD0 and the arm AM0 are inclined to the left side with respect to the axis AX. The heads HD1 to HD6 and the arms AM1 to AM6 are not substantially inclined with respect to the axis AX. The head HD7 and the arm AM7 are inclined to the right side with respect to the axis AX.

Figure 24:
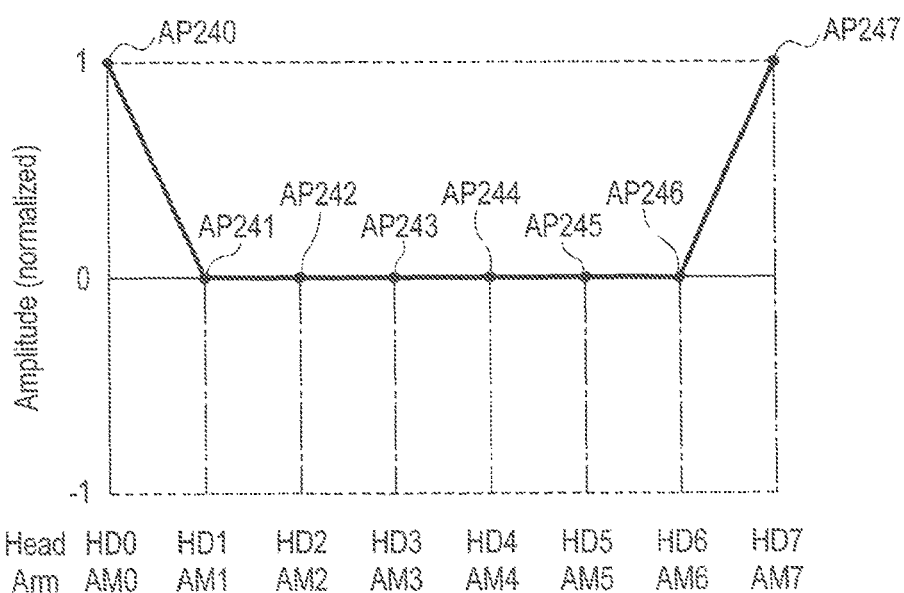
FIG. 24 is a diagram illustrating an example of amplitudes corresponding to the heads and the arms in a case where the HDA is vibrated as illustrated in FIG. 22 and FIG. 23.

FIG. 24 is a diagram illustrating an example of amplitudes corresponding to the heads HD and the arms AM in a case where the HDA 10 is vibrated as illustrated in FIG. 22 and FIG. 23. In FIG. 24, the ordinate axis indicates the amplitude, and the abscissa axis indicates the heads HD and the arms AM corresponding to the respective amplitudes. In FIG. 24, the amplitudes corresponding to the heads HD and the arms AM are each normalized using a particular value. Thus, in FIG. 24, the amplitudes corresponding to the heads HD and the arms AM fluctuate between a particular value with the positive polarity, for example, 1, and a particular value with the negative polarity, for example, −1. In FIG. 24, for the amplitude, the maximum value with the positive polarity is 1, and the maximum value with the negative polarity is −1.

In the example illustrated in FIG. 24, an amplitude AP240 for the head HD0 and the arm AM0 is the maximum value with the positive polarity (1). The amplitudes AP241 to AP246 for the heads HD1 to HD6 and the arms AM1 to AM6 are 0. An amplitude AP247 for the head HD7 and the arm AM7 is the maximum value with the positive polarity (1).

If a resonance mode occurs which varies the amplitudes of the heads HD and the arms AM as illustrated in FIG. 24, the system controller 130 executes the disturbance suppression process, for example, the loop shaping process. For example, if the head HD0 is changed to the head HD1, the system controller 130 inputs, to the filter FT, the past values multiplied by the ratio of the amplitude AP240 of the head HD0 to the amplitude AP241 of the head HD1 (AP241/AP240). If the head HD0 is changed to the head HD7, the system controller 130 inputs, to the filter FT, the past values multiplied by the ratio of the amplitude AP240 of the head HD0 to the amplitude AP247 of the head HD7 (AP247/AP240). The system controller 130 generates the suppression amount Uls based on the currently input estimated position error Ep, the currently input model position error Epm, the past values, and the like.

According to the second embodiment, if a head change is performed with a resonance mode other than the synchronous resonance mode occurring, the magnetic disk device 1 can suppress the adverse effects of vibration resulting from the resonance mode other than the synchronous resonance mode during seeking by the next head HD. Therefore, the magnetic disk device 1 is capable of improving the accuracy of the servo control.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
   a disk comprising a first surface and a second surface opposite to the first surface;
   a first head configured to execute read/write processing on the first surface;
   a second head configured to execute read/write processing on the second surface;

an actuator configured to position the first head and the second head over the disk; and a controller configured to control the actuator based on a first value suppressing a disturbance component, wherein the controller is configured to adjust the first value based on at least one of a ratio between a first amplitude of the first head and a second amplitude of the second head and correction of phases in a case where the first head is changed to the second head at a first timing.

2. The magnetic disk device of claim 1, wherein the controller comprises a filter configured to output the first value based on an input value and a memory in which a past input value input to the filter before input of the input value and a past output value output from the filter before output of the first value are recorded.

3. The magnetic disk device of claim 2, wherein the controller is configured to multiply the past input value by the ratio to input a resultant value to the filter.

* * * * *